(12) United States Patent
Srinivas et al.

(10) Patent No.: US 12,556,552 B2
(45) Date of Patent: *Feb. 17, 2026

(54) AUTOMATIC INTEGRATION OF IOT DEVICES INTO A NETWORK

(71) Applicant: VeloCloud Networks, LLC, Santa Clara, CA (US)

(72) Inventors: Anand Srinivas, San Francisco, CA (US); Murtaza Zafer, San Jose, CA (US); Goutham Vijayakumar, Newark, CA (US); Cheok Wan, Sunnyvale, CA (US)

(73) Assignee: VeloCloud Networks, LLC, Santa Clara, CA (US)

( * ) Notice: Subject to any disclaimer, the term of this patent is extended or adjusted under 35 U.S.C. 154(b) by 608 days.

This patent is subject to a terminal disclaimer.

(21) Appl. No.: 16/942,643

(22) Filed: Jul. 29, 2020

(65) Prior Publication Data

US 2021/0392171 A1    Dec. 16, 2021

Related U.S. Application Data

(60) Provisional application No. 63/039,378, filed on Jun. 15, 2020.

(51) Int. Cl.
*H04L 9/40*    (2022.01)
*G06F 21/57*    (2013.01)
(Continued)

(52) U.S. Cl.
CPC ........... *H04L 63/1425* (2013.01); *G06N 5/04* (2013.01); *G06N 20/00* (2019.01); *G16Y 40/20* (2020.01);
(Continued)

(58) Field of Classification Search
CPC . H04L 63/1425; H04L 63/02; H04L 63/0227; H04L 63/20; H04L 63/205;
(Continued)

(56) References Cited

U.S. PATENT DOCUMENTS

2020/0120004 A1\*  4/2020  Kohout ............... H04L 41/0893
2020/0213361 A1\*  7/2020  Du ....................... H04L 63/104
(Continued)

FOREIGN PATENT DOCUMENTS

EP    4266627 A1 \*  10/2023   ......... H04L 63/0281

OTHER PUBLICATIONS

Tianrui Hu, Daniel J. Dubois, David Choffnes; "BehavIoT: Measuring Smart Home IoT Behavior Using Network-Inferred Behavior Models"; IMC '23: Proceedings of the 2023 ACM on Internet Measurement Conference; Oct. 2023; pp. 421-436 (Year: 2023).\*
(Continued)

*Primary Examiner* — Fatoumata Traore
*Assistant Examiner* — Courtney D Fields
(74) *Attorney, Agent, or Firm* — BainwoodHuang

(57) ABSTRACT

Some embodiments provide a novel method that performs an automated process that identifies features of an IoT device connected to a network, and based on the identified features specifies, without an administrator input, one or more network policies (e.g., security policies) to apply to packets sent or received by the IoT device. The method of some embodiments also performs automated processes that (1) analyze packet flows to and from the IoT devices to identify dynamic network behavior of these devices, and then (2) specify network policies based on the identified dynamic network behavior.

20 Claims, 13 Drawing Sheets

(51) Int. Cl.
*G06N 5/04* (2023.01)
*G06N 20/00* (2019.01)
*G16Y 40/20* (2020.01)
*G16Y 30/10* (2020.01)
*H04W 8/02* (2009.01)
*H04W 12/12* (2021.01)
*H04W 12/50* (2021.01)

(52) U.S. Cl.
CPC .......... *H04L 63/02* (2013.01); *H04L 63/0227* (2013.01); *H04L 63/20* (2013.01); *H04L 63/205* (2013.01); *G16Y 30/10* (2020.01)

(58) Field of Classification Search
CPC .......... G06N 5/04; G06N 20/00; G06N 3/088; G06N 5/047; G16Y 40/20; G16Y 30/10
See application file for complete search history.

(56) References Cited

U.S. PATENT DOCUMENTS

2020/0358794 A1* 11/2020 Vasseur ................ G06F 16/285
2020/0387746 A1* 12/2020 Tedaldi ................ G06N 20/00
2021/0203521 A1*  7/2021 Konda ................ H04L 63/1425
2021/0297442 A1*  9/2021 Vasseur ............... H04L 63/1441

OTHER PUBLICATIONS

Non-Published Commonly Owned Related U.S. Appl. No. 16/942,648 with similar specification, filed Jul. 29, 2020, 48 pages, VMware, Inc.

* cited by examiner

Average Number of Daily Communications between Devices and Servers over 10-Day Period

| | Server-1 | Server-2 | Server-3 | Unknown server |
|---|---|---|---|---|
| Device-1 | 100 | 50 | 120 | 100 |
| Device-2 | 98 | 56 | 119 | 0 |
| Device-3 | 101 | 50 | 113 | 0 |
| Device-4 | 100 | 55 | 116 | 0 |
| Device-5 | 97 | 57 | 116 | 0 |
| Device-6 | 99 | 55 | 120 | 0 |
| Device-7 | 100 | 56 | 122 | 0 |
| Device-8 | 98 | 54 | 115 | 0 |
| Device-9 | 98 | 57 | 118 | 0 |
| Device-10 | 101 | 57 | 113 | 0 |

AUTOMATIC INTEGRATION OF IOT DEVICES INTO A NETWORK

BACKGROUND

In recent years, there has been a proliferation of IoT (Internet of Things) devices. IoT devices are purpose-built devices such that every device has a similar behavior compared to other devices of the same IoT device-type when deployed in the same network environment. For example, temperature sensors at a manufacturing facility would all take temperature readings and report the readings to an application server at different times in a day such that for a given time window, the destination server set will be similar for each of the temperature sensors, but will differ from destination server sets of other devices in the network. Additional examples of IoT devices include pumps, ventilators, security systems, other home appliances (e.g., smart refrigerators) traffic control devices, manufacturing equipment, agricultural devices, etc.

With this recent proliferation of IoT (Internet of Things) devices, it is becoming increasingly difficult for IT (information technology) teams within large enterprises (e.g., hospitals, corporations, educational institutions, etc.) to keep an inventory of all the IoT devices that have been deployed in the network, especially as these devices are deployed by disparate teams without any central coordination. IoT devices generally have a small form factor and run third-party software which makes it hard to install software modules on them. Therefore, a need exists for techniques that go beyond installing software agents on the IoT devices. IoT devices behave differently than other network devices in two main ways: (1) IoT devices are purpose-built and perform a designated set of functions repeatedly over time, and (2) IoT devices of the same type perform the same set of functions. In other words, IoT devices have similar behavior across the same type of devices but discriminating behavior across devices of other types.

BRIEF SUMMARY

Some embodiments provide a novel method for defining network policies for IoT (Internet of Things) devices in a network. For instance, the method of some embodiments performs an automated process that identifies features of an IoT device connected to a network, and based on the identified features, specifies one or more network policies (e.g., security policies) for the IoT device without an administrator input. In some embodiments, the method detects that a particular IoT device has been connected to the network. The method then identifies one or more features of the particular IoT device, such as destination servers with which the particular IoT device communicates, network attributes (e.g., VLAN) used by the particular IoT device over time, transmitted bytes over time, network protocols used by the particular IoT device over time, etc.

Based on the identified features, the method then classifies the IoT device. For instance, in some embodiments, the method defines a set of one or more discriminating features associated with the particular IoT device that differentiate and separate the particular IoT devices from other types of IoT devices in the network. Examples, of discriminating features in some embodiments include a combination of server names and OUI (organizationally unique identifier).

Based on the discriminating features of the particular IoT device (e.g., based on the set of features associated with the IoT device), the method determines a device classification for the particular IoT device, and based on this classification, defines a set of network policies to apply to the particular IoT device. Examples of such network policies include (1) firewall rules enforced by network firewall devices, and (2) network access control policies enforced by network access controllers. Conjunctively, or alternatively, the method of some embodiments defines other security policies (e.g., intrusion detection policies, intrusion prevention policies, etc.), other middlebox policies (e.g., load balancing policies), and other forwarding policies (e.g., gateway forwarding policies, etc.).

In addition to, or instead of, defining network policies based on identified static features of IoT devices, the method some embodiments performs automated processes that (1) analyze packet flows to and from the IoT devices to identify dynamic network behavior of these devices, and then (2) specify network policies based on the identified dynamic network behavior. For instance, the method of some embodiments collects network statistics for a set of IoT devices. It then analyzes the collected network statistics to identify anomalous behavior exhibited by any IoT devices in the set of IoT devices.

The method then identifies a particular IoT device in the set of IoT devices as one that is exhibiting anomalous behavior, and subsequently takes remedial action to rectify the identified anomalous IoT device. The method performs different remedial actions in different embodiments. For instance, in some embodiments, the method defines a security policy (e.g., a firewall rule, a network access control rule, etc.) to block all network traffic to and/or from the anomalous IoT device, or to block a subset of network traffic to and/or from this device. Conjunctively, or alternatively, the method publishes (e.g., sending an electronic communication to report) the identity of the anomalous IoT device to an administrator (e.g., by email, by text, or by creating a report for display on a portal) for remediation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 11 illustrates a visual representation of a comparative analysis performed for a set of IoT devices to identify behavioral outliers, according to some embodiments.

DETAILED DESCRIPTION

Figure 1:
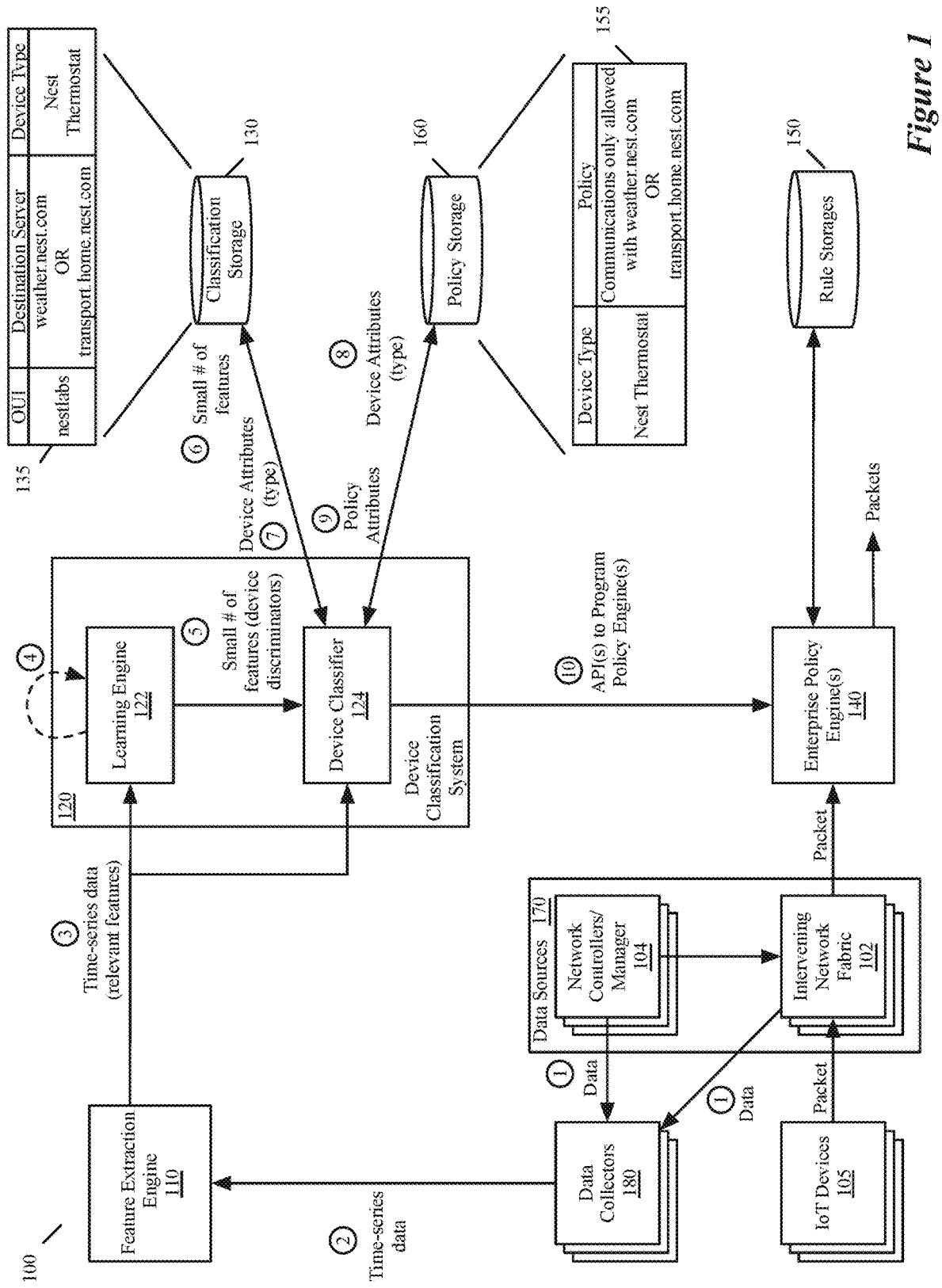
FIG. 1 conceptually illustrates an example of a system that performs an automated process to identify features of an IoT device connected to a network and specifies one or more network policies for the IoT device without an administrator input, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for defining network policies for IoT (Internet of Things) devices in a network. For instance, the method of some embodiments performs an automated process that identifies features of an IoT device connected to a network, and based on the identified features, specifies one or more network policies (e.g., security policies) for the IoT device without an administrator input.

In some embodiments, the method detects that a particular IoT device has been connected to the network. The method then identifies one or more features of the particular IoT device, and based on these identified features, categorizes the IoT device (e.g., associates the IoT device with one or more categories). The method defines a set of network policies to apply to the particular IoT device based on its categorization of the IoT device.

Firewall rules enforced by network firewall devices are one type of network policies defined by the method of some embodiments. For example, the method in some embodiments uses a category associated with the IoT device to identify a set of one or more firewall rules specified for the category, and to provide the identified set of firewall rules to a firewall engine or appliance to enforce. Network access control rules enforced by a network access controller are another type of network policies defined by the method of some embodiments. For example, the method of some embodiments uses a category associated with a newly connected IoT device to determine whether the newly connected IoT device should be allowed to access the network.

In another example, the method of some embodiments uses a category associated with an anomalously behaving IoT device to determine whether an anomalously behaving IoT device should have access to the network, and if not, to direct the network access controller to terminate the device's access to the network. Conjunctively, or alternatively, the method of some embodiments defines other security policies (e.g., intrusion detection policies, intrusion prevention policies, etc.), other middlebox policies (e.g., load balancing policies), and other forwarding policies (e.g., gateway forwarding policies, etc.). Several additional examples of such other policies are provided below.

As used in this document, packets refer to a collection of bits in a particular format sent across a network. One of ordinary skill in the art will recognize that the term packets is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1 illustrates an IoT management system 100 of some embodiments that implements the method of some embodiments. The system 100 identifies features of an IoT device connected to a network, and based on the identified features, specifies one or more network policies (e.g., security policies) for the IoT device without an administrator input. As shown, the system 100 includes IoT devices 105, data sources 170, data collectors 180, a feature extraction engine 110, a device classification system 120, and enterprise policy engines 140. Additionally, the device classification system 120 includes a learning engine 122 and a device classifier 124. One example of the data flow between the components of the systems 100 is represented through the use of arrows and textual/numerical references adjacent to these arrows in FIG. 1. These arrows along with their associated textual/numerical references are purely exemplary and other data flows between these components exist as further described below and as appreciated by one of ordinary skill.

In some embodiments, IoT devices 105 are purpose-built devices that perform a limited set of operations, as opposed to general purpose computers that can be programmed to perform a myriad of different operation. Examples of IoT devices include temperature sensors, pumps, ventilators, security systems, other home appliances (e.g., smart refrigerators) traffic control devices, manufacturing equipment, agricultural devices, etc. IoT devices of the same class or type often perform similar operations as, and have similar behaviors when compared to, other IoT devices of the same type or class. For example, temperature sensors deployed in a building (e.g., datacenter, hospital, office, manufacturing facility, etc.) would all take temperature readings and report the readings to an application server at different times in a day such that for a given time window, the destination server set will be similar for each of the temperature sensors, but will differ from destination server sets of other devices in the network.

In performing their operations, IoT devices 105 in some embodiments send and receive packets to destination machines inside the network (not shown) in which the IoT devices are deployed and/or outside of the network. The data sources 170 capture data relating to the IoT devices by analyzing these packets, and collecting data through their interactions with the IoT devices. As shown, the data sources 170 include intervening network fabric 102 and network managers/controllers 104 in some embodiments. The data collectors 180 then collect data captured by the data sources 170, and provide this data to the feature extraction engine 110.

Figure 2:
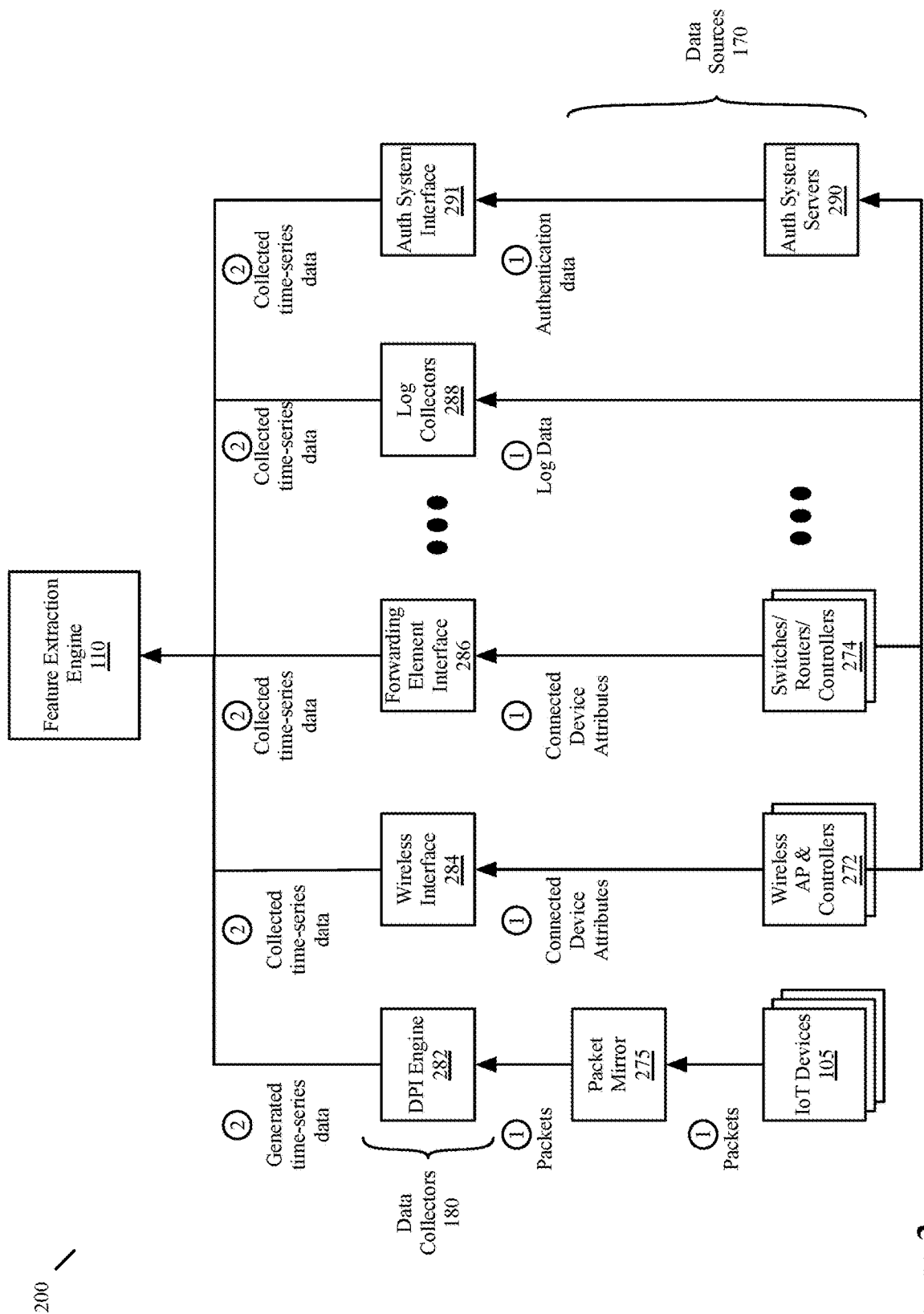
FIG. 2 conceptually illustrates examples of the data sources and data collectors described in FIG. 1, according to some embodiments.

FIG. 2 illustrates an example of data sources 170 and data collectors 180 used in some embodiments of the invention. In this example, the set of data sources 170 include packet mirror 292, wireless devices and controllers 272, switches/routers and controllers 274, and authentication servers 290. The set of data collectors 180 includes the DPI engine 282, wireless interface 284, forwarding element interface 286, log collectors 288, and authentication-server interface 291. The data sources and collectors illustrated in FIG. 2 are just some of the data sources and collectors in some embodiments.

As the IoT devices 105 send and receive packets, the packet mirror 292 mirrors (copies) the packets and provides the copied packets to the DPI engine 282. The packet mirror 292 can be implemented in many different ways in some embodiments. For example, the packet mirror in some embodiments can be implemented as an appliance, an inline filter (e.g., tap), span port, etc.

On the packet that it receives from the packet mirror 275, the DPI engine 282 performs deep packet inspection in order to analyze the packets and identify additional attributes of the packet (e.g., information from the payload of the packet). For example, in some embodiments, the deep packet inspection on the first few packets of a packet flow identifies the type of traffic contained in the payload of the packets of the flow, and generates an AppID that expresses the identified traffic type, which can in turn be used as a feature for classifying the IoT device.

In addition to the DPI engine, the system 100 use the interfaces and collectors 284, 286, 288 and 291 as data crawlers that collect data from a variety of data sources 272, 274, and 290 regarding the packets that they process for the IoT devices and/or regarding their interactions with the IoT devices. Examples of the collected data include server data tuples (e.g., servers contacted by the device over time), transmitted bytes data tuples (e.g., data transmitted by the device over time), received bytes data tuples (e.g., data received by the device over time), protocol data (e.g., protocols used by the device over time), Wi-Fi metrics data tuples (e.g., ESSID, Wi-Fi channel, etc. used by the device over time), network attributes data tuples (e.g., network attributes such as VLAN used by the device over time), device attributes data tuples (e.g., OUI (organizationally unique identifier) of the chipset used, manufacturer of the chipset, etc.), and network device data tuples (e.g., data sent by network devices like WLCs, switches, routers, network access control or IPS/IDS systems, etc.). These data tuples are collected over a duration time or collected repeatedly over several time periods, and hence are referred to below as collected time-series data.

In some embodiments, the wireless interface 284 collects attributes of connected wireless IoT devices from the wireless access points (APs) 272 and the controllers 272 that configure these access points. For example, in some embodiments, the wireless interface 284 collects attributes such as the MAC (media access control) addresses of connected wireless IoT devices, the protocols used by those connected wireless devices (e.g., LTE, 5G, Bluetooth, Z-Wave, BLE (Bluetooth low energy), etc.), Wi-Fi metrics data tuples (e.g., ESSID, Wi-Fi channel, etc.). In some embodiments, the wireless interface 284 collects these attributes using APIs (Application Programming Interfaces) calls, SNMP (simple network management protocol) commands, CLIs (command line interface) commands, etc.

In some embodiments, the forwarding element interface 286 collects IoT device attributes from the switches/routers 274 and the controllers 274 that configure these switches/routers. For instance, the forwarding element interface 286 in some embodiments collects attributes such as the MAC addresses of IoT devices connected to the switches/routers, the name and location of switch interfaces to which IoT devices are connected, the servers with which the connected MAC addresses communicate, the protocols used by the connected devices, etc. In some embodiments, the forwarding element interface 286 uses APIs, NetFlow, CLIs, and other proprietary or standard protocols to collect the device attributes from the switches/routers and their controllers 274.

The log collectors 288 in some embodiments collect log files from the wireless APs 272, the switches/routers 274 and/or their associated controllers 272 and 274. Examples of log files include event logs (e.g., transaction logs) and message logs (e.g., public and private instant messaging logs, peer-to-peer file sharing logs, etc.). In some embodiments, the authentication system interface 291 collects data regarding the IoT devices that the authentication servers 290 (e.g., RADIUS (Remote Authentication Dial-In User Service) servers) have authenticated when the devices have been added to the network. Example of data collected from the authentication servers 290 include whether the access requests were granted, the number of access requests from each IoT device, the authentication server's classification of the device, etc.

The data crawlers 284, 286, 288 and 291 in some embodiments parse the data that they collect and provide to the feature extraction engine 110 a respective set of features for each IoT device that connects to the network. In these embodiments, the feature extraction engine 110 collects the features identified for each IoT devices and provides the collected set of features to the device classification system 120. In other embodiments, the data crawlers simply pass the data tuples that they collect to the feature extraction engine 110, which then parses the received data tuples for each IoT device, identifies and aggregates the features from the parsed data, and provides an aggregated set of features for each IoT device to the device classification system 120. In still other embodiments, the data crawlers perform some parsing of the collected data tuples, while the feature extraction engine perform the rest of the parsing of the collected data.

In any of these approaches, the feature extraction engine 110 provides a set of features identified for an IoT device over a duration of time to the device classification system 120. Also, in some embodiments, the feature extraction engine 110 provides to the classification system 120 newly identified features and/or changes to previously identified features for an IoT device after providing an initial set of features to the classification system, as it identifies new or modified features for the IoT device.

In some embodiments, the feature extraction engine 110 identifies relevant features from the data received from the data collectors 180 to be provided to the device classification system 120. For example, in some embodiments, the feature extraction engine 110 provides the OUIs of chipsets of different IoT devices by performing a lookup based on the MAC addresses (provided by the data collectors 180) and other relevant collected data, such as the destination servers with which the IoT devices communicate and the frequency of those communications, etc.

The feature set for each IoT device is provided to the learning engine 122 and the device classifier 124 of the device classification system 120. In some embodiments, the learning engine 122 identifies a subset of the provided feature set as discriminating features for the device classifier 124 to use to classify each IoT device (e.g., identifies a smaller number of features from the large number of features provided in the feature extractor 110). When providing the discriminating feature set for an IoT device to the device classifier 124, the learning engine 122 in some embodiments provides this feature set with the MAC address of the IoT device (or another identifier associated with the IoT device) so that the device classifier 124 can identify the feature set that it should classify based on the discriminating features provided by the learning engine 122.

In some embodiments, the learning engine 122 is a machine-trained network, such as a neural network with machine-trained numerous neurons, some of which have their outputs combined through machine-trained weight values and feed to other neurons. Examples of the identified discriminating features for an IoT device in some embodiments include set of servers a device connects to within a given time window, protocols used by the device for such connections, amount of data sent/received by the device, and the OUI of the chipset of the device. In some embodiments, the machine-trained network 122 is an unsupervised learning engine that clusters IoT devices with similar features and/or behaviors into groups of IoT devices. This engine in some embodiments builds multi-dimensional statistical features the collected time series data, and identifies groups of IoT devices based on the built multi-dimensional features.

In other embodiments, the learning engine is a machine trained network that is trained through a training processes that trains the processing nodes of the network by providing known feature sets of IoT device groups with known group identifiers. Also, in some embodiments, the learning engine 122 further learns/trains after the IoT management system is deployed based on feedback provided by a user or behavioral assessment process, as further described below.

The device classifier then uses classification rules stored in a rule storage 130 to classify each IoT device based on the discriminating features identified by the learning engine 122. The classification operation identifies a category for the IoT device by comparing the set of features identified for the IoT device with sets of features that are match criteria of classification rules. Each classification rule in some embodiments provides a category that is to be assigned to an IoT device when the set of features identified for the IoT device match the rule's associated match criteria feature set.

For example, FIG. 1 illustrates an example of a classification rule 135. This rule associates a set of features with a category "Nest Thermostat." In this example, the set of features includes a particular OUI (e.g., an OUI associated with nestlabs) as well as destination servers with which devices of that type communicate (e.g., weather.nest.com or transport.home.nest.com). Hence, devices having an OUI of "nestlabs" that communicate with weather.net.com and/or transport.home.nest.com are to be classified as Nest thermostats. In this example, the classification rule has match attributes defined in terms of OUI and destination server, and an action attribute defined in terms of the device type. The match attributes are used to match with the discriminating features of an IoT device, while the action attribute is used to classify (specify) the device type for an IoT device with features that match the match attributes of the rule.

Each classification rule can be viewed as a device signature in some embodiments. A device signature can include device features arranged in logical expressions, e.g., "oui=nestlabs AND (destination=weather.nest.com OR transport.home.nest.com)", according to some embodiments. While these examples include a couple of features for simplicity, other embodiments use more complex signatures to identify the IoT devices based on numerous different discriminating features identified for these devices.

In some embodiments, the device classification system 120 uses clustering processes to identify clusters (i.e., to identify groups or cohorts) of similar IoT devices. In some embodiments, this clustering is performed by the learning engine 120 as part of its identification of the discriminating features of an IoT device, while in other embodiments, this clustering is performed by the device classifier 124. When performed by the learning engine 120, the discriminating features provided by the learning engine 120 to the device classifier 124 in some embodiments differentiates and separates one IoT device group from another IoT device group.

During the training of the learning engine 122, IoT devices are categorized into different groups, such that the type of IoT devices (e.g., classification) in that group can be inferred based on the common patterns of the network features. Using this common pattern of features, some embodiments define classification signatures (classification rules) that can be used to classify an IoT device that has one of the common patters of network features associated with one of the identified groups of IoT device. As mentioned above, device signatures in some embodiments include device features arranged in logical expressions. Once a classification rule (or device signature) is defined, some embodiments use it to classify any device that exhibits the same behavior both in the future as well as in different environments.

The classification rules for different groups of IoT devices can be defined by reference to different features and different number of features. For instance, in some embodiments, ultrasound machines from certain manufacturers have several model revisions. As a result, in some embodiments, the behavior of these devices is identical except for the server names that each sends out. By creating a classification rule that does not include the server name, these ultrasound machines can be correctly classified as being from a certain manufacturer, according to some embodiments. This is different than the above-described classification rule for the Nest thermostats, which uses the destination server data tuple. Even without the exact model revision, the classification information for the ultrasound machines is useful.

In some embodiments, relaxed classification rules are created with a lower priority than an exact rule. In the event that an exact rule match is found, the device is classified under the model from the exact classification, according to some embodiments. Otherwise, if an exact rule match is not found, the classification rule that is less exact (e.g., a relaxed rule) is used to classify the device. This is achieved in some embodiments by arranging classification rules in a hierarchical manner using priority scores. As IoT groups evolve, the device classification system in some embodiments enhances or narrows down the device signatures to classify devices most accurately in some embodiments.

The classification storage 130 in some embodiments is a common database or device-indexing search engine that stores device signatures (i.e., device classification rules). The device classifier 124 in some embodiments submits search queries to the classification storage to classify an IoT device. In some embodiments, the device classifier 124 performs this operation once for each IoT device, while in other embodiments it performs this operation more than once (e.g., periodically) for an IoT device. To perform its query, the device classifier 124 in some embodiments provides a small number of features to the classification storage 130, and in return receives device attributes including the device type corresponding to the inputted small number of features, according to some embodiments.

When the device classifier 124 matches an IoT device with a classification rule (e.g., by getting an exact match between the discriminating features of the IoT device and the match attributes of the classification rule, or in lieu of an exact match, by getting a less-exact match, as described above), the device classifier 124 uses the device type identified by the matching classification rule to retrieve one or more sets of policy attributes to use to direct one or more enterprise policy engines to implement one or more policies on the packets sent and received by the IoT device.

Examples of such policies include security policies (e.g., firewall policies, network access control policies, intrusion detection policies, intrusion prevention policies, quarantining policies, etc.), middlebox policies (e.g., load balancing policies), forwarding policies (e.g., next hop routing policies), monitoring policies, behavioral analytical policies (e.g., to identify behavioral anomalies), etc. Examples of enterprise policy engines include (1) firewall engines, (2) network access controllers, (3) IPS systems, (4) IDS systems, (5) other middlebox engines and appliance, (6) switches, (7) routers, (8) traffic monitoring applications, engines, and appliances, etc.

To implement the identified set of policies for an IoT device, the device classifier 124 in the example illustrated in FIG. 1 uses API calls to provide policy commands and attributes to the enterprise policy engines 140. Based on these commands and attributes, the enterprise policy engines define and enforce rules (stored in rule storages 150) on the packets sent and received by the IoT device. In other embodiments, the device classifier 124 provides its API calls to device managers and controllers (not shown in FIG. 1), which then configure the enterprise policy engines with rules (stored in the rule storages 150) that implement the identified set of policies for the IoT device.

After defining or receiving a rule for implementing a policy for packets sent or received by an IoT device based on the policy attributes provided by the device classifier, the enterprise policy engines use these rules to process packets to and from the IoT device. For instance, in some embodiments, the firewall engines use a firewall rule for a particular type of IoT devices to restrict the number of destination devices with which that type of IoT devices can communicate. One example of this would be a firewall rule for Nest thermostats that direct the firewall engine or appliance to ensure that the thermostat only communicates with certain destination IP addresses associated with the Nest servers.

In another example, network access controllers of some embodiments use network access control policies (e.g., authentication and authorization policies) defined for different types of IoT devices to allow or deny network access to newly connected IoT devices. For example, once a newly detected IoT device has been classified by the device classifier, a network access controller can perform a lookup on the MAC address of the IoT device to identify the classification of the IoT device and a policy associated with the classification that indicates whether devices of that classification should be allowed or denied, according to some embodiments. One example of such a network access control policy would be to allow all IoT devices classified as Nest thermostats.

In some embodiments, the network access controller is also configured to re-evaluate anomalously behaving IoT devices to determine whether an anomalously behaving IoT device should have access to the network, and if not, to terminate the device's access to the network. For example, when anomaly detection engine 330 determines that an anomalously behaving IoT device should no longer have access to the network, this engine in some embodiments directs the network access controller to terminate the IoT device's access to the network. In this situation, the anomaly detection engine 330 in other embodiments provides one or more access control rules to the network access controller that cause this controller to terminate the IoT device's access to the network.

The defined or received rules that the enterprise policy engines 140 enforce in some embodiments include other security rules (e.g., rules for implementing intrusion detection policies, intrusion prevention policies, etc.), other middlebox rules (e.g., rules for implementing load balancing policies), forwarding rules (e.g., rules for implementing gateway forwarding policies, etc.), traffic monitoring rules (e.g., rules for mirroring packets to servers or appliances to analyze the packets), etc.

Figure 3:
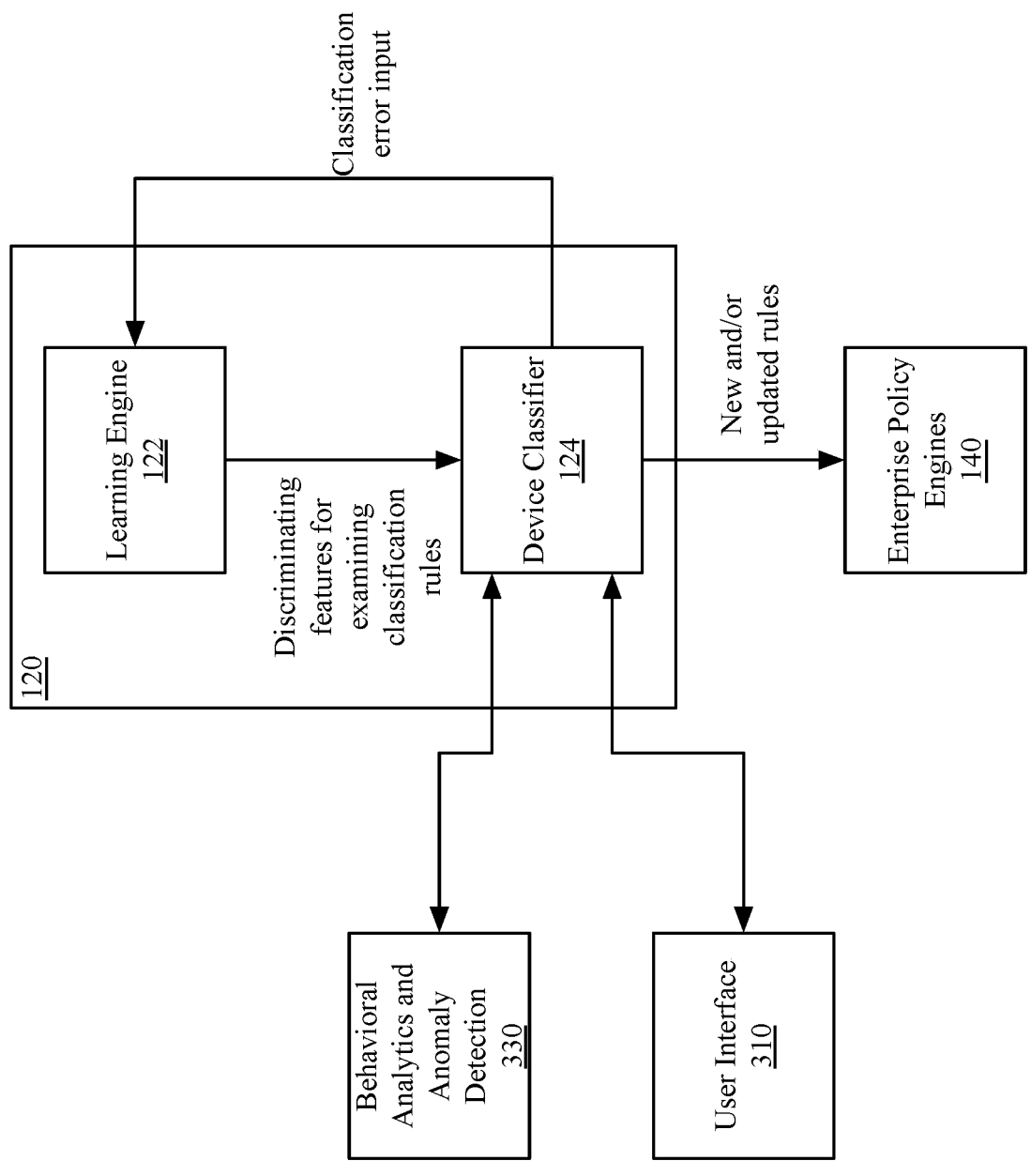
FIG. 3 conceptually illustrates another example of a system that performs an automated process to identify features of an IoT device connected to a network, specifies one or more network policies for the IoT device, and reprocesses/reclassifies misclassified data, according to some embodiments.

In addition to defining network policies based on identified static features of IoT devices, the IoT management system of some embodiments performs automated processes that (1) analyze packet flows to and from the IoT devices to identify dynamic network behavior of these devices, and (2) provide data to the device classification system 120 that can cause the device classification system 120 to reclassify an IoT device. FIG. 3 illustrates an example of such reclassification. Specifically, it illustrates the device classifier 124 receiving feedback data from an administrator (not shown) through a user interface 310 and from a behavioral analytics and anomaly detection engine 330 (also called behavioral assessment engine 330).

Insufficient data can present practical difficulties in classifying devices using exact rules, and in turn may cause the device classifier to misclassify devices. For example, not all device features that are included in a classification rule, in some embodiments, are observed by the IoT management system 100 at a given point in time. For instance, in some embodiments, this is because certain features take time to emerge. Conjunctively, or alternatively, configuration differences in a network may result in some data being unavailable in some embodiments.

Hence, as shown in FIG. 3, a user interface (UI) 310 provides data from an administrator regarding the misclassification of an IoT device 105 to the device classifier 124. For an administrator to provide this input, the IoT management provides to the administrator through the UI 310 a report (e.g., by email or through a management portal) that specifies the identified type of each IoT device deployed in the network and detected by the management system 100.

Conjunctively, or alternatively, the device classifier 124 in some embodiments receives input from the behavioral assessment engine 330 that allows the device classifier to determine that an IoT device has been misclassified. In some embodiments, the behavioral assessment engine's input specifies that the IoT device has been misclassified, while in other embodiments, the device classifier analyzes the behavioral assessment engine's input to determine on its own that it has misclassified the IoT device.

When the device classifier 124 determines that an IoT device has been misclassified (e.g., on its own, or based on input from administrator or behavioral assessment engine 330), the device classifier provides feedback data to the learning engine 122 that cause the learning engine 122 to modify its machine-trained parameters (e.g., weight values) to produce a different set of discriminating features for the IoT device and other similar IoT devices in the future. In some embodiments, the device classifier 124 adjusts the set of features used to define one or more classification rules based on the different set of discriminating features produced by the learning engine 122 for the IoT device and other similar IoT devices. Alternatively, or conjunctively, the device classifier 124 uses the different set of discriminating features to add one or more new classification rules to ensure proper classification of the IoT device and other similar IoT devices, according to some embodiments.

Also, based on the determined misclassification, the device classifier 124 identifies one or more sets of new policies from the policy storage 160 for the re-classified IoT device, and through one or more API calls provides the newly identified sets of policies to the policy engines 140, or the controllers/managers of these engine 140. Based on the API calls, the policy engines, or their controllers/managers, define new rules for the policy engines to enforce in order to implement the newly identified sets of policies on the packets sent and received by the IoT device.

Figure 4:
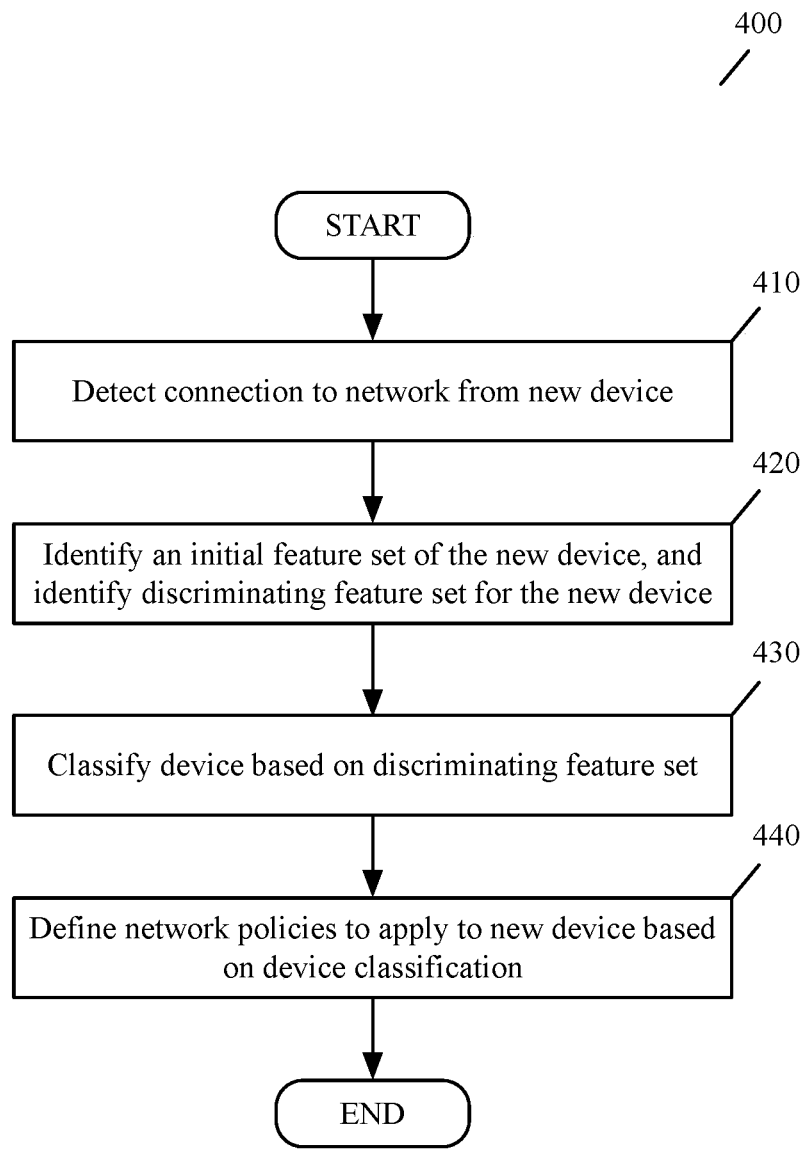
FIG. 4 illustrates a process for defining network policies to apply to an IoT device, according to some embodiments.

FIG. 4 illustrates a process 400 that the IoT management system 100 performs in some embodiments to define network policies to apply to IoT devices in a network. As shown, the process 400 starts at 410 by detecting that a new IoT device is connected to the network. The management system 100 detects a new IoT device is the network by having one or more of its data collectors (e.g., wireless or forwarding-element interface 284 or 286) collect a new MAC address from one of the data sources (e.g., wireless APs/controllers 272 or forwarding elements/controllers 274) that the management system 100 has not previously received and stored in a MAC address storage.

Specifically, in some embodiments, the management system stores each MAC address that its data collectors identify for each IoT device in the network. Hence, whenever the management system 100 receives a MAC address, it determines whether it has stored that MAC address in its MAC address storage, and if not, it determines that the MAC address belongs to an IoT device that has been newly connected to the network.

Next, at 420, the process 400 identifies a set of features of the new device. As described above, the data collectors 180 collect data tuples relating to the IoT devices from the data sources 170, which analyze packets associated with the IoT device and/or collect data through their interactions with the IoT devices. The data collectors 180 then provide the data tuples that they collect for an IoT device (e.g., as identified through the IoT device's MAC address) to the feature extraction engine 110.

As mentioned above, the provided data tuples identify an initial set of features in some embodiments, while in other embodiments the provided data tuples are analyzed by the feature extraction engine 110 to identify the initial set of features associated with the IoT device. In still other embodiments, some of the initial set of features are provided by the data collectors, while other features in the initial set are parsed and produced by the feature extraction engine 110 by analyzing the data provided by the data collectors. The feature extraction engine 110 then provides the initial feature set for the newly detected IoT device to the device classification system 120. The learning engine 122 of the classification system 120 identifies the discriminating set of features for the newly detected IoT device.

Next, at 430, the device classifier uses the discriminating feature set to classify the newly detected IoT device. For instance, as described above, the device classifier in some embodiments uses classification rules stored in the rule storage 130 to classify the IoT device based on the discriminating features identified by the learning engine 122. After classifying the newly detected IoT device, the device classifier 124 uses (at 440) the identified device type to identify one or more sets of policy attributes to use to direct one or more enterprise policy engines to implement one or more policies on the packets sent and received by the newly detected IoT device, and then ends.

As described above, the device classification method in some embodiments applies unsupervised clustering methods to automatically determine groups of likely IoT devices. Alongside this method, some embodiments also provide a method for behavioral analysis over time of these classifications of IoT devices to ensure they continue to behave the exact same way. In particular, some embodiments ensure that none of the IoT devices exhibit anomalous behavior. Examples of such anomalous behavior, in some embodiments, includes numerical and behavior outliers.

Hence, in addition to defining network policies based on identified static features of IoT devices, the IoT management system 100 uses its behavioral assessment engine 330 (1) to analyze packet flows to and from the IoT devices to identify dynamic network behavior of these devices, and then (2) to specify network policies based on the identified dynamic network behavior. The behavioral assessment engine 330 in some embodiments collects network statistics for a set of IoT devices. It then analyzes the collected network statistics to identify anomalous behavior exhibited by any IoT devices in the set of IoT devices.

When the behavioral assessment engine 330 identifies a particular IoT device in the set of IoT devices as one that is exhibiting anomalous behavior, the behavioral assessment engine (1) directs the device classification system 120 to provide new policies to the enterprise policy engines 140 to generate rules to remedy the identified anomalous behavior, or (2) provides the new policies directly to the enterprise policy engines 140 to generate rules and remedy the identified anomalous behavior.

Figure 5:
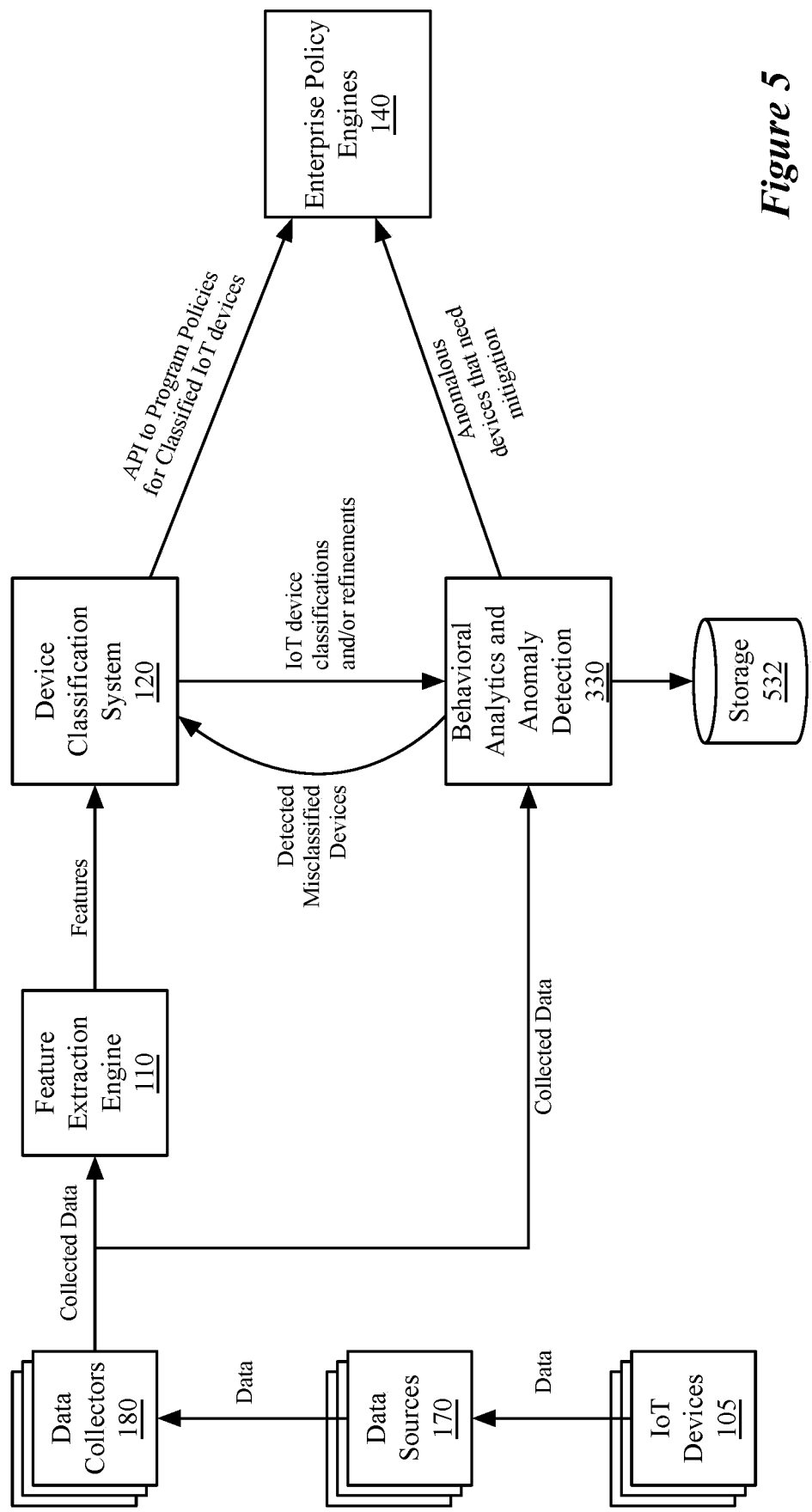
FIG. 5 conceptually illustrates an example of a system that performs an automated process to enforce network policies defined for IoT devices in a network, according to some embodiments.

FIG. 5 illustrates an example of an IoT management system 500 that uses such a behavioral assessment engine 330. The management system 500 is similar to the management system 100 except that it uses the behavioral assessment engine 330 to identify anomalous behavior by the IoT devices and to command (directly or indirectly) the enterprise policy engines to enforce new or modified policies when processing packets to and from these IoT devices.

As shown, the behavioral assessment engine 330 receives the IoT device classifications from the device classification system 120. From the data collectors 180, the behavioral assessment engine 330 also receives data tuples regarding the packet processed by the IoT devices. In some embodiments, the collected data tuples that the behavioral assessment engine 330 receives includes the data tuples provided to the feature extraction engine 110 and other types of data tuples that are not provided to the feature extraction engine 110. For instance, in some embodiments, the behavioral assessment engine receives mirrored copies of the packets sent from or received by the IoT devices 105.

In other embodiments, the behavioral assessment engine 330 repeatedly (e.g., periodically) receives from the data collectors 180 attributes of these packets, such as the packet header attributes (e.g., five- or seven-tuple header identifiers of the processed packet flows), statistics regarding the processed flows (e.g., number of bytes, number of packets, etc.), and other related data regarding the processed flows. The mirrored packets and/or packet attributes are provided by inline filters or appliances that are deployed in the packet datapaths to and from the IoT devices, as well as data collected from other network elements (e.g., from wireless APs/controllers, from switches and routers, from controllers/managers of switches and routers, etc.).

From the data tuples that the behavioral assessment engine 330 receives from the data collectors 180 and the device classification system 120, the behavioral assessment engine 330 (1) creates models that characterize each IoT device's behaviors as well as models that characterize each IoT device group's behaviors, (2) stores these models in one or more storages 532, (3) updates these models as it receives more data tuples, and (3) periodically analyzes these models to identify any IoT device that is behaving in an anomalous manner.

Figure 6:
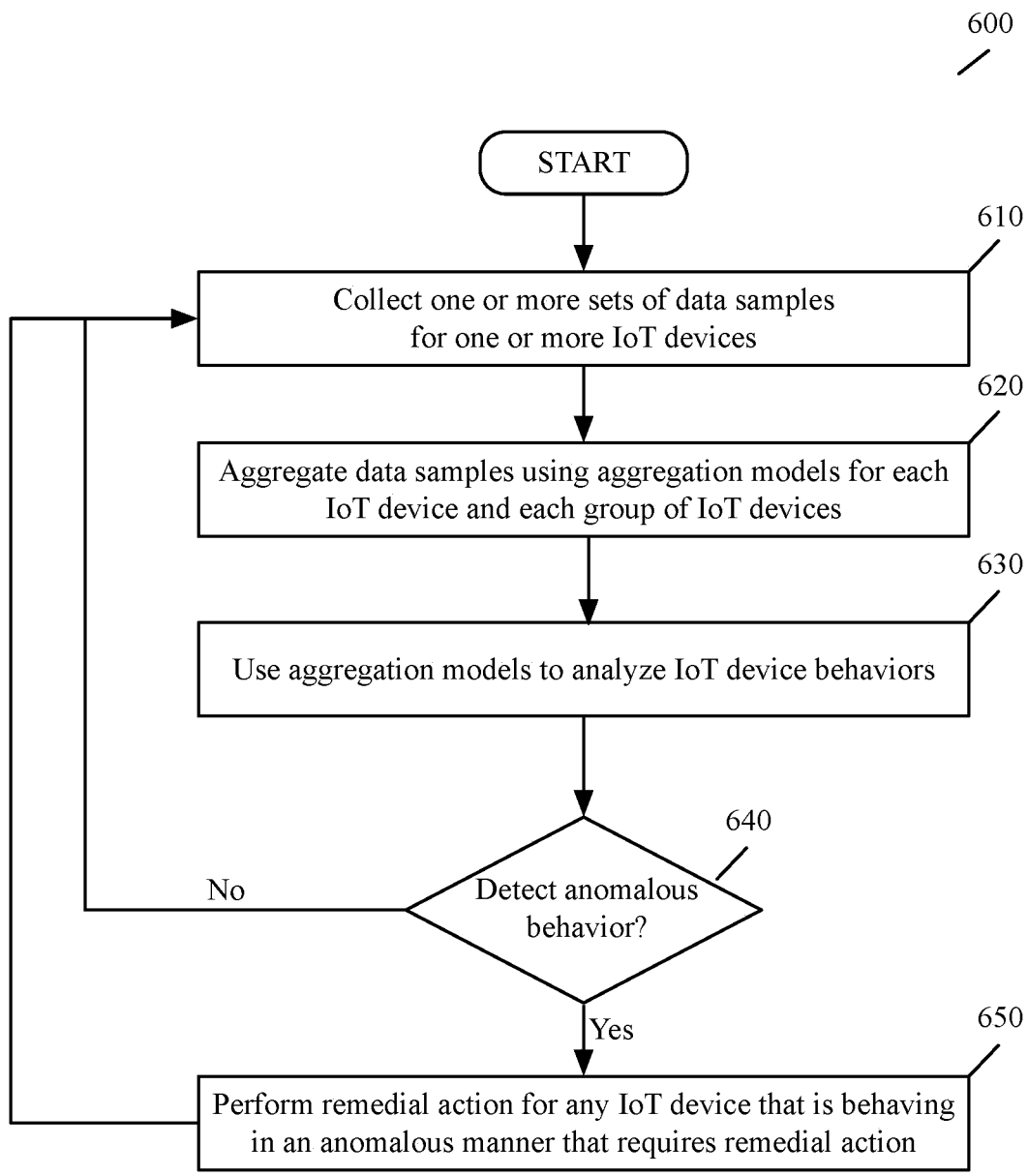
FIG. 6 illustrates a process that a behavioral assessment engine performs, according to some embodiments.

FIG. 6 presents a conceptual illustration of a process 600 that the behavioral assessment engine 330 performs in some embodiments. This illustration is conceptual as some embodiments perform the operations reflected in FIG. 6 not necessarily in the same sequence and/or not as part of one single process but rather as part of several concurrently running processes. As shown, the process 600 starts at 610 by receiving data samples for one or more IoT devices from the data collectors 180, which collect data samples repeatedly from a variety of data sources 170 as described above.

Next, at 620, the process 600 uses one or more aggregation models to aggregate the samples collected at 610. After detecting a newly connected IoT device in the network (e.g., a device associated with a newly detected MAC address), the IoT management system 500 (e.g., the device classification system 120 or the behavioral assessment engine 330) creates a set of one or more device aggregation models for the newly identified IoT device and associates this aggregation model with the device's identifier (e.g., the device's MAC address).

For each IoT device, the IoT management system 500 creates a set of "current" aggregation models reflecting the recent behavior of the IoT device over a recent shorter duration of time (e.g., the packets sent and received by the IoT device during a short duration of time, such as the last few minutes, last hour, last few hours, last day, etc.), as well as a set of "historical" aggregational models reflecting the behavior of the IoT device over a longer duration of time (e.g., the packets sent and received by the IoT device since the IoT device was detected in the network).

When the device is a first device of a group of devices deployed in the network, the IoT management system 500 also creates a set of one or more device-group aggregation models for the device's group. Each time an IoT device is detected, the IoT management system 500 associates the device with a group identifier through which the device can be associated with its device group and its device-group aggregation models. Examples of device and device-group aggregation models in some embodiments include device histograms and device-group histograms. Each histogram is associated with one or more data packet attributes (e.g., destination servers, frequency of communication with destination servers, number of packets exchanged, number of flows exchanged, sizes of payloads, types of data traffic, etc.) that the data collectors 180 collect for the packets sent and received by the IoT devices and device groups.

In some embodiments, the process 600 updates (620) the set of current aggregation models (e.g., histograms) of the IoT devices and device groups for which the process received data samples at 610. The aggregation models in some embodiments allow the behavioral assessment engine 330 to reduce large amounts of data samples collected for an IoT device or a group of IoT devices into a smaller amount of aggregated data buckets that can be analyzed to identify anomalous behaviors of one or more IoT devices.

The process 600 updates (at 620) the set of device and device-group current aggregation models differently in different embodiments and for different aggregation models. For instance, when the aggregation model is a multi-bucket histogram associated with one or more collected packet attributes, the process 600 updates the device and device-group aggregation models at 620 by incrementing values stored in aggregation buckets of the histograms associated with the collected packet attributes. The behavioral assessment engine 330 also periodically updates each historical aggregation model by blending a portion (e.g., some or all) of the aggregated data from the associated current aggregation model (i.e., the current aggregation model associated with the historical aggregation model) with any aggregated data previously stored in the historical aggregation model.

The process 600 periodically analyzes (at 630) the set of current device aggregation models of each IoT device to determine whether the IoT device is acting in an anomalous manner. In some embodiments, this analysis entails comparing the set of current device aggregation models of each IoT device with the set of historical device aggregation models of the IoT device as well as with the current and historical group aggregation models of the IoT device's group of IoT devices. Such analysis determines whether each IoT device is acting in an anomalous manner compared to how the IoT device behaved previously, and to how the IoT device is behaving compared to other IoT devices in the same group currently or historically. Examples of such analysis will be further described below.

Next, at 640, the process 600 determines whether its analysis of the aggregation models at 630 identified any IoT device that is acting anomalously (e.g., identified an IoT device communicating with a particular destination server at a higher frequency than any other IoT device in the same group). If not, the process returns to 610 to receive additional data samples from the data collectors, and to perform its subsequent operations to process these data samples. On the other hand, when the process determines (at 640) that one or more IoT device are acting anomalously, the process performs (at 640) one or more remedial actions for one or more anomalously acting IoT devices, when such remedial action is needed.

In some embodiments, the remedial actions include informing the device classification system of a potentially misclassified device (as shown in FIG. 5), or providing an alert to a set of network administrators regarding the anomalous behavior of an IoT device. As described above, the feedback from the behavioral assessment engine might cause the device classification system to retrain its learning engine. Also, in some embodiments, information regarding the anomalous behavior is provided to set of network administrators through a user interface so that the administrators can assess the anomalous behavior, take remedial actions, and possibly reclassify the device.

The remedial actions also include in some embodiments directing new policies to be defined for, and enforced by, the enterprise policy engines 140. Examples of such policies include defining new firewall policies to block certain types of traffic received or sent by an IoT device, directing a network access controller to determine whether the previously authenticated and authorized IoT device should no longer be authenticated or authorized, directing the IoT device traffic to a datacenter for additional analysis (e.g., for IPS or IDS analysis), generating a log to capture data regarding packets received or sent by the IoT device, quarantining of the IoT device, etc.

As shown in FIG. 5, the behavioral assessment engine 330 directly communicates in some embodiments with the enterprise policy engines 140 to direct these engines to create and enforce new policies. In other embodiments, the behavioral assessment engine 330 directs the device classification system 120 or a set of managers/controllers to communicate with the enterprise policy engines 140 to create the new policies and have these policy engines enforce the new policies.

In some embodiments, not all anomalous behaviors result in an immediate remedial action. For instance, in some embodiments, the process simply creates a record of an anomalous behavior so that it can later perform a remedial action if it detects several additional instances of this anomalous behavior over a duration of time. After 640, the process returns to 610 to receive additional data samples from the data collectors, and to perform its subsequent operations to process these data samples.

Figure 7:
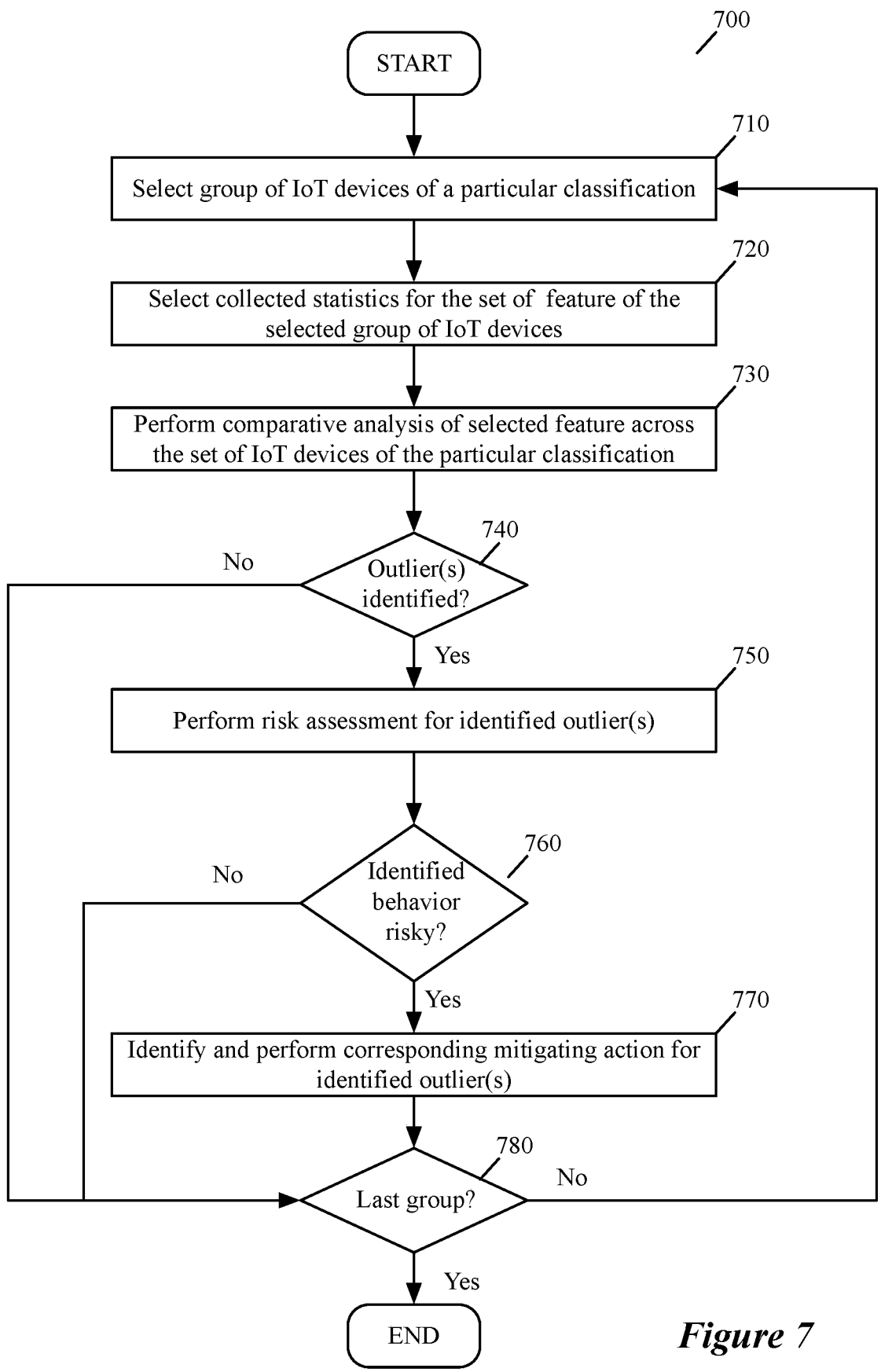
FIG. 7 illustrates a process for enforcing network policies in a network that includes IoT devices, according to some embodiments.

FIG. 7 illustrates a process 700 that the behavioral assessment engine 330 periodically performs in some embodiments to analyze aggregated data for a group of similar IoT devices. As shown, the process 700 selects (at 710) a group of similar IoT devices of a particular classification (e.g., a group of thermostats). Next, at 720, the process selects a collection of feature of the selected group for which the data collectors have collected data and the behavioral assessment engine has aggregated device and group aggregation models. In some embodiments, the selected collection of features is the discriminating feature set used to define classification rules that are used to classify IoT devices into groups of IoT devices. Examples of discriminating features may include the number of destination servers with which the selected group of IoT devices communicate, number of packets sent and received by the IoT devices in the group, etc. Alternatively, or conjunctively, the selected feature in some embodiments is any feature relevant to the selected device group for which data collectors collect data tuples and the behavioral assessment engine 330 builds device and group aggregation models.

At 730, the process performs a comparative analysis on the aggregated data for the selected feature set across the group of IoT devices in order to determine whether the aggregated data for one or more device deviates significantly from the aggregated data of the other devices in the selected group. In other words, this determination tries to identify outliers in the aggregated data sets of the selected device group as such outliers might be indicative of an IoT device that is behaving in a risky anomalous manner.

Examples of outliers can include numerical outliers (e.g., a device has communicated X standard deviations more than other devices in the group with one or more destination IP addresses) and behavioral outliers (e.g., a device communicates with a destination IP/server no other device in the cohort has communicated with before). To identify such outliers, the behavioral assessment engine 330 of some embodiments computes probability deviations (e.g., by projecting histograms onto Gaussian distributions), and set deviations (e.g., by performing computations that express the degree of deviation between a particular device's aggregated data for the selected feature and the aggregated mean data for the selected group of IoT devices).

In order to identify numerical outliers, some embodiments use baseline statistics regarding various relevant features for the entire cohort over a period of time (e.g., days) to detect deviant behavior. Alternatively, to identify behavioral outliers, some embodiments detect anomalous behavior based on unique relevant features for the entire cohort over a period of time (e.g., several days). In some embodiments, the behavioral outliers include any new behavior exhibited by a device in the cohort that no other devices in the cohort are exhibiting. Examples of relevant and unique features of some embodiments include destination IPs/servers, source/destination VLANs/subnets, protocols, traffic level, GEOs of visited IPs/servers, etc.

Some embodiments use multi-environment benchmarks (e.g., numerical benchmarks and/or behavioral benchmarks) of a cohort of IoT devices across multiple "similar" (e.g. same vertical, similar number of client devices, etc.) environments to detect when a device's behavior deviates significantly from similar devices in similar environments.

Alternatively, or conjunctively, the process performs (at 730) a comparative analysis on the aggregated data for the selected feature for each IoT device in order to determine whether the current aggregated data for the IoT device deviates significantly from the historical aggregated data of the IoT device. In other words, some embodiments compare the device's current aggregated data for the selected feature to the historical baseline of this data for the individual device itself (e.g., rather than compared to the entire cohort).

By comparing data of a particular device to past data of the particular device for the same feature, a determination can be made as to whether the current behavior of the device is atypical. Such a determination of atypical behavior can be indicative of the particular device behaving in an anomalous manner. Alternatively, when a determination is made that the particular device's current aggregated data (i.e., current behavior) for the selected feature set matches the device's historical aggregated data (i.e., historical behavior) for the same feature set, such a determination can be used to offset a determination that the device is acting anomalously because the device's current aggregated data diverges from the current or historical aggregated data of the selected group for the same feature set. However, for some device group and/or some deployments of the IoT management system, a device's typical behavior cannot negate a determination that the device is behaving anomalously as its behavior diverges from the behavior of its group.

Figure 8:
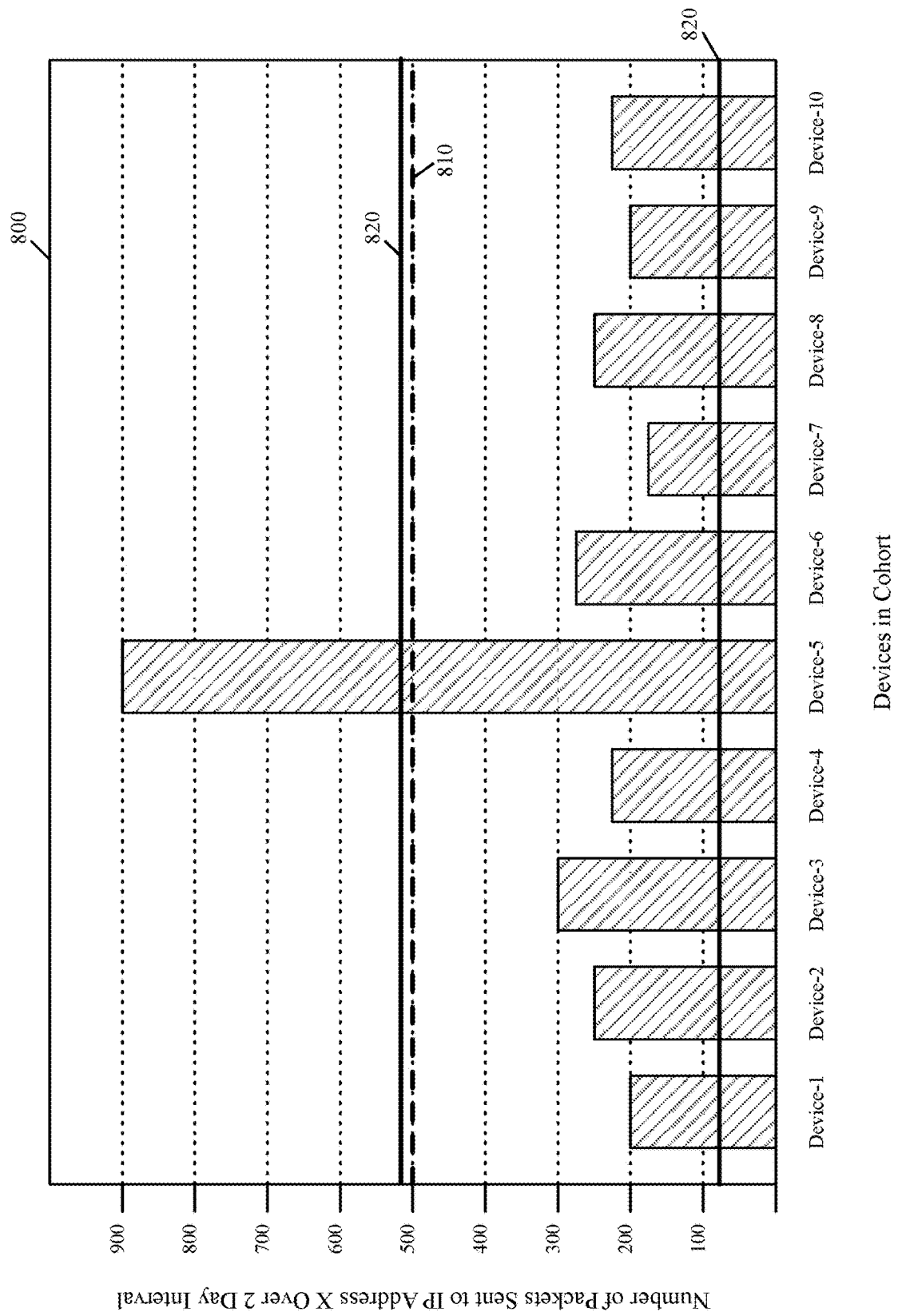
FIG. 8 illustrates a visual representation of a comparative analysis performed for a set of IoT devices to identify numerical outliers, according to some embodiments.

FIGS. 8-11 illustrate several examples of outlier behavior. While these examples use simple graphs relating to a single feature, it should be noted that some embodiments use more complex models (e.g., multi-dimensional histograms) that are based on collection of features that are defined for an IoT device group. FIG. 8 presents an aggregated bar graph 800 that illustrates the number of packets sent to Server Address X (e.g., a VIP address for a group of servers) by a group of ten IoT devices over a two-day interval. The mean number packets sent by the devices of the cohort is represented by the mean line 810, while the standard deviation for the cohort is represented by the lines 820.

As illustrated, the number of packets sent by Device-5 to Server Address X deviates significantly from the number of packets sent to Server Address X by other devices in the cohort. Additionally, as shown, the number of packets sent by Device-5 to Server Address X is well outside of the margin of error (i.e., standard deviation) for the cohort. When a device is determined to deviate significantly from the mean of the cohort, some embodiments perform additional analyses to determine whether the deviant behavior of the device is also abnormal for that device. Alternatively, or conjunctively, some embodiments provide information regarding the anomalous device to a user (e.g., network administrator) through a user interface for remediation.

Figure 9:
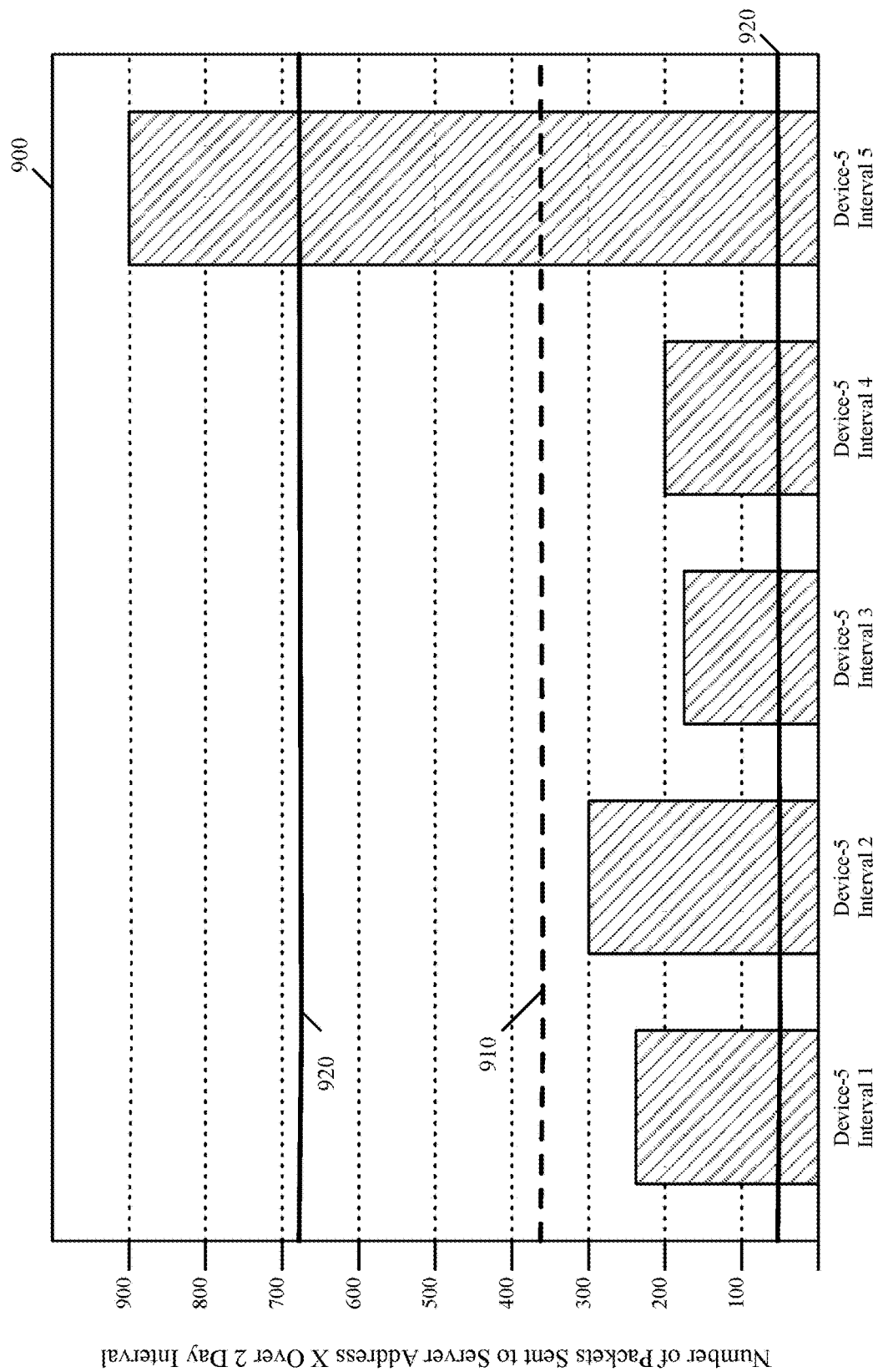
FIG. 9 illustrates an additional visual representation of a comparative analysis performed for a set of IoT devices to identify numerical outliers, according to some embodiments.

FIG. 9 presents an aggregated bar graph 900 that illustrates the number of packets sent to Server Address X by Device-5 during five different two-day intervals, with interval 5 being the interval during which the anomalous behavior was observed. The graph 900 includes the mean number of packets 910 sent by Device-5 during each of the five intervals, and the standard deviation 920 for Device-5 over the course of the five intervals. Similar to the behavior illustrated in the graph 800, the behavior of Device-5 during interval 5 compared to the behavior of Device-5 during each of the other intervals 1-4 deviates significantly from the mean behavior and exists outside of the standard deviation for the device over the five intervals.

Figure 10:
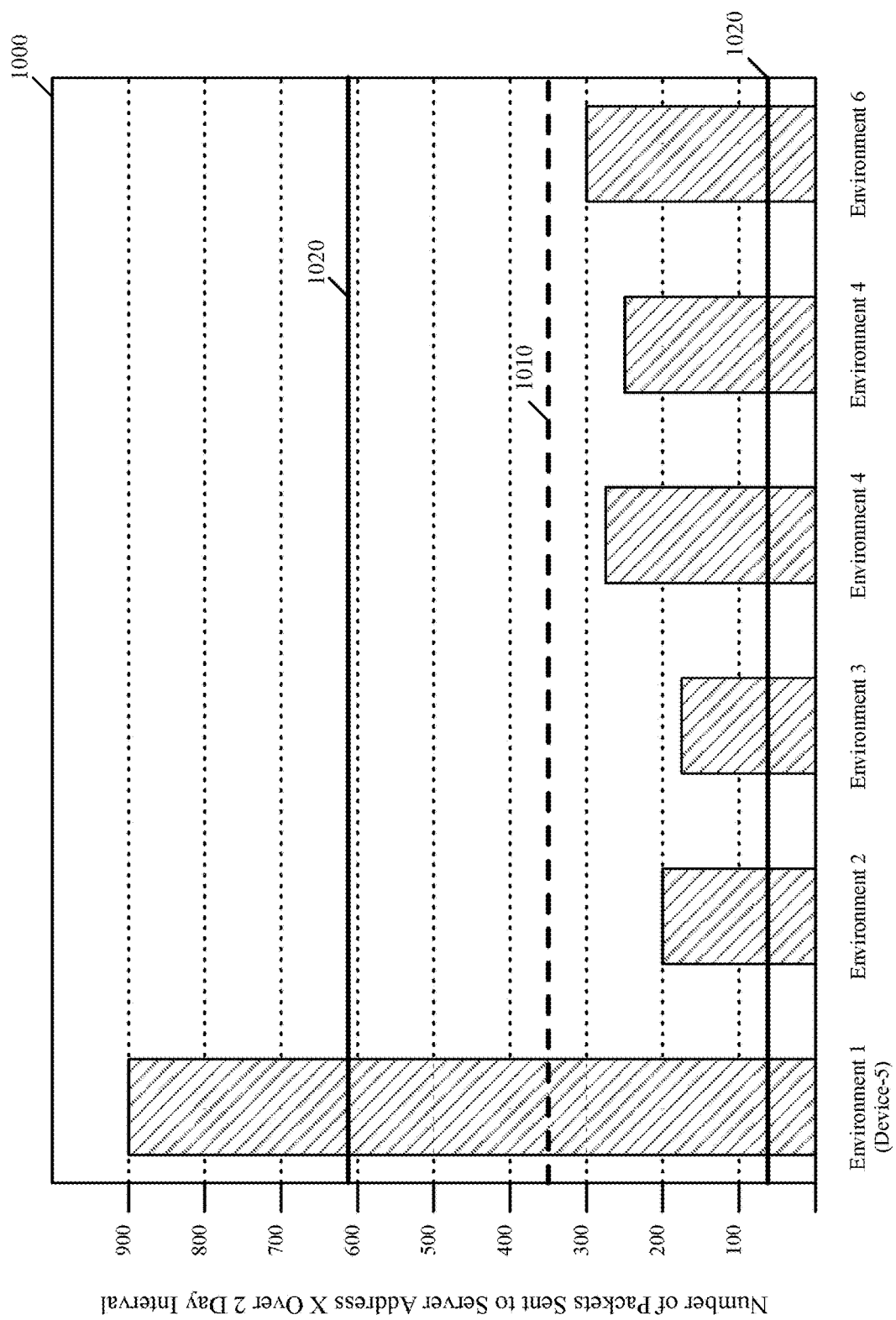
FIG. 10 illustrates an additional visual representation of a comparative analysis performed for a set of IoT devices to identify numerical outliers, according to some embodiments.

Alternatively, or conjunctively, some embodiments compare data across multiple "similar" (e.g., same vertical, similar number of client devices, etc.) customer environments to detect when a device's behavior deviates significantly from the multi-customer baseline. FIG. 10 presents a bar graph 1000 that compares the number of packets sent to Server Address X over a two day interval by Device-5 of Environment 1 versus the mean number of packets sent over a two day interval by IoT devices of other environments (Environments 2-6) similar to Environment 1. Like the graphs 800 and 900, graph 1000 includes a mean line 1010 representing the combined mean number of packets sent by Device-5 of Environment 1 and IoT devices of each of the Environments 2-6, as well as lines 1020 indicating standard deviation. Thus, from graph 1000, it can be deduced that the behavior of Device-5 is anomalous compared to the behavior of other IoT devices of other cohorts in similar environments.

While the graph 1000 includes only the packets sent by Device-5 in Environment 1, some embodiments compare the behavior entire cohorts across the customer environments to identify anomalous behavior of any of the cohorts (i.e., compare the mean number of packets sent by the entire cohort of devices 1-10 of Environment 1 with each of the Environments 2-6). Also, while the examples in FIGS. 8-10 are specified for number of packets sent by the devices to a server, other embodiments may compare other features (e.g., protocols used, packets received, etc.), or multiple features (e.g., packets sent and/or received using various protocols), to detect anomalous behavior of IoT devices.

FIG. 11 presents a matrix diagram 1100 that illustrates the average number of daily communications between a set of IoT devices and a set of servers over a ten-day period. As shown, the matrix diagram 1100 includes a first column listing the set of IoT devices and a first row 1102 listing the set of servers with which the IoT devices communicate, with the remaining cells of the matrix diagram including relationships (e.g., number of communications exchanged) between each of the IoT devices and the servers (i.e., at the cross section of each device and server).

In contrast to the example graphs 800, 900, and 1000 described above, the average number of communications between each of the devices 1-10 and the servers 1-3 over the ten-day period do not identify any numerical outliers (i.e., any anomalous behavior). However, as shown in the first row 1102, Device-1 exchanges communications with a fourth server, "Server-Unknown", that no other devices in the set (i.e., devices 2-10) have communicated with, indicating that behavior as a behavioral outlier, and further that the behavior of Device-1 is anomalous.

Returning to FIG. 7, after the process 700 performs the comparative analysis (such as those described above by reference to FIGS. 8-11) of the selected feature across the selected group of IoT devices, the process moves to 740 to determine whether any outliers have been identified. When the process determines that no outliers have been identified, the process transitions to 780, which will be described below. Otherwise, when the process determines that one or more outliers have been identified, the process transitions to 750 to perform a risk assessment for the identified outlier(s) to determine whether the identified outlying behavior constitutes risky behavior that requires mitigation.

For example, the process 700 can detect that one or more IoT devices are accessing external websites that they should not be accessing but these website are known as non-malicious sites, and/or are accessing internal/external servers that are known to be safe. In these situations, the process 700 designates these detected outlier behaviors as not risky behavior that requires mitigation.

At 760, the process determines whether the risk assessment (at 750) determined the identified anomalous behavior is risky. When the process determines that the anomalous behavior is not risky, the process transitions to 780, which will be described below. On the other hand, when the process determines (at 760) that the identified anomalous behavior is risky, the process performs (at 770) one or more mitigating actions to remedy the identified anomalous behavior, and then transitions to 780.

Examples of such mitigating actions include in some embodiments directing new policies to be defined for, and enforced by, the enterprise policy engines 140. Examples of such policies include defining new firewall policies to block certain type of traffic received or sent by an IoT device, directing the IoT device traffic to a datacenter for additional analysis (e.g., for IPS or IDS analysis), generating a log to capture data regarding packets received or sent by the IoT device, quarantining of the IoT device, etc. In some embodiments, the remedial actions also include informing the device classification system of a potentially misclassified device, and/or providing an alert to a set of network administrators regarding the anomalous behavior of an IoT device.

At 780, the process determines whether it has examined all groups of IoT devices for which the data collectors have collected data and the behavioral assessment engine has aggregated device and group aggregation models. If so, the process 700 ends. Otherwise, the process returns to 710 to select another IoT device group to analyze.

In some embodiments, mission critical IoT devices can be isolated from the common network for both operational and security reasons. In some embodiments, IoT devices of a certain model or type can be isolated from the rest of the network by programming the infrastructure. This can help in some embodiments with better network performance guarantees, less noisy environments, and as a defensive measure. For example, in some embodiments, all critical healthcare devices can be isolated to a segment of the network where access is limited. The reverse can also be done, in some embodiments, with non-critical IoT devices that may have behaviors that affect the network segment they are on. For example, chatty non-critical devices or IoT devices used by guests can be isolated by placing them on network segments with lesser performance guarantees in some embodiments. Doing so, in some embodiments, helps to allocate limited networking resources like bandwidth in an optimal way.

These policies can be applied to devices on a group-level in some embodiments, i.e., all devices in a particular group are placed in an appropriate part of the network. This type of policy assignment is static in nature in some embodiments. In order to add a dynamic quality, some embodiments apply policies to newly detected devices of a certain model on an ongoing basis. Evolving operational characteristics (e.g., traffic sent by devices of a certain model) can also be used to move them between different segments of the network as appropriate in some embodiments.

When an anomaly is detected, network policies of some embodiments can be triggered to quarantine a misbehaving device to a more secure part of the network, or to remove it from the network altogether. Based on alerts generated by the IoT management system, policies can either be applied manually or be triggered automatically by the system. These policies are applied dynamically as opposed to relying on static thresholds in some embodiments. The threshold in some embodiments is a baseline that is derived from devices on a particular environment and also globally (e.g., as described above for FIGS. 7-11). As the behavior of a device evolves with software updates or with additional functionality being added, the baseline in some embodiments also continues to change with it, thereby enabling the reduction of false positives, and application of policies for true anomalies. In some embodiments, these actions can be programmatically executed by communicating with any one of a network access control server, a network controller system, and by communicating directly with network infrastructure devices. The communication can be done over existing web API standards or using more traditional API (e.g., SNMP or CLI), according to some embodiments.

Figure 12:
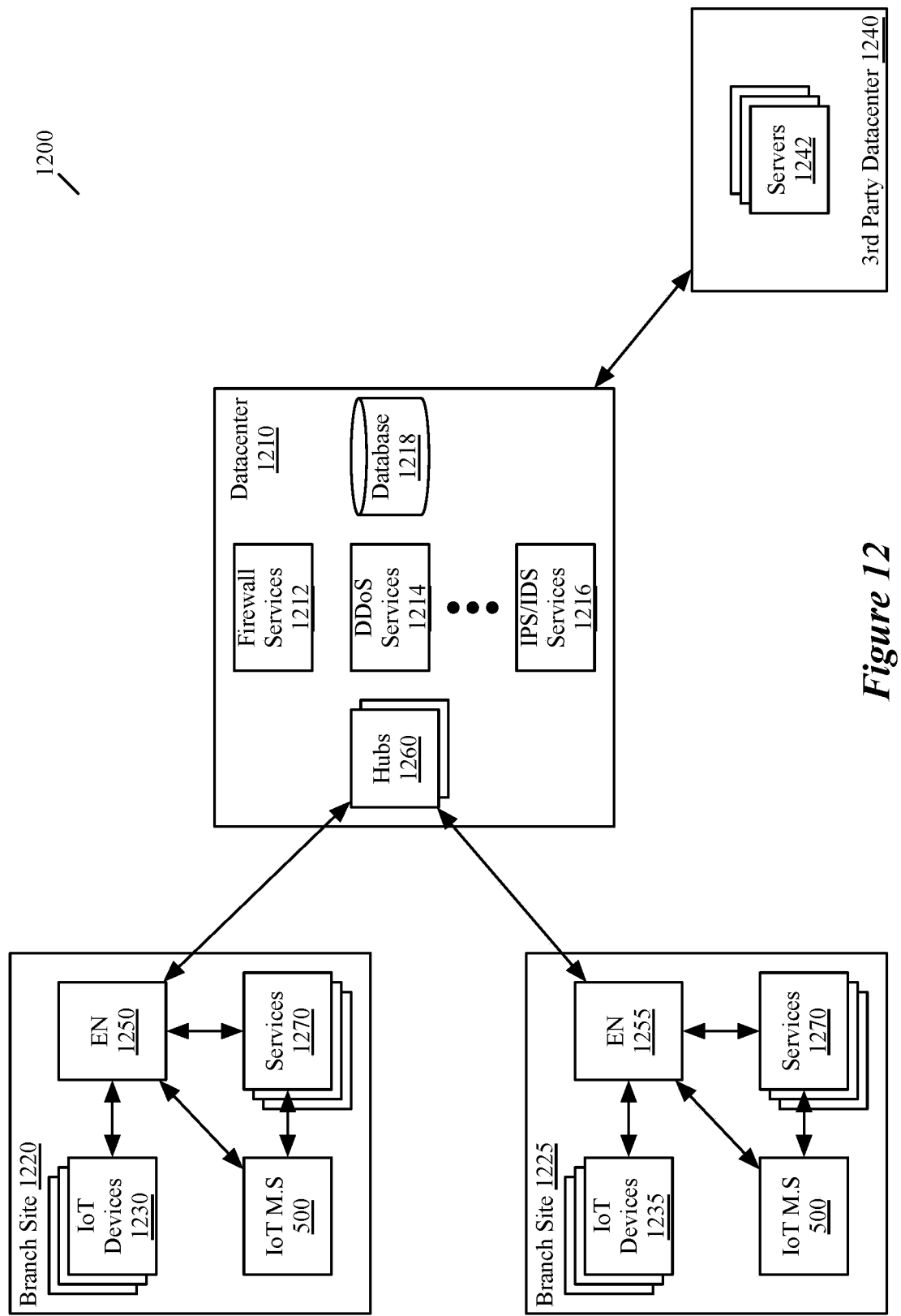
FIG. 12 illustrates an example in which an IoT device management system integrates IoT devices of an entity into an SD-WAN network that connects local area networks (LANs) of two branch sites and a datacenter.

The IoT management system of some embodiments is used to integrate IoT devices seamlessly into software-defined wide area network (SD-WAN) of an entity. FIG. 12 illustrates one such example in which the IoT device management system 500 integrates IoT devices of an entity into an SD-WAN network that connects local area networks (LANs) of two branch sites 1220 and 1225 and a datacenter 1210. The datacenter 1210 acts as a hub that connects machines and IoT devices at each branch site to the machines and IoT devices at the other branch site as well as to servers 1242 at other third party datacenters 1240. The SD-WAN 1200 is established by a controller cluster (not shown) configuring forwarding edge nodes 1250-1255 in the branch sites 1220-1225 and the hub nodes 1260 in the datacenter 1210.

In some embodiments, each forwarding edge node is an edge machine (e.g., virtual machine or containers) or stand-alone appliance that operates at one multi-computer location of the entity (e.g., at an office of the entity) to connect the computers at this location to the hub nodes of the entity's datacenter(s) and other forwarding edge nodes of other locations (if so configured). In some embodiments, the forwarding edge nodes are clusters of forwarding edge nodes at each of the multi-computer location. Also, in this example, the hub nodes 1260 are deployed as machines (e.g., VMs or containers) in a datacenter 1210.

The hub nodes 1260 in some embodiments provide the branch sites 1220-1225 with access to compute, storage, and service resources of the datacenter. For example, the datacenter 1210 includes firewall services 1212, DDoS (distribute denial of service) services 1214, IPS/IDS services 1216, databases 1218, and compute machines (not shown) (e.g., VMs and/or containers). In some embodiments, the connections between the branch sites and the datacenter hubs are secure encrypted connections that encrypt packets exchanged between the edge nodes of the branch sites and the datacenter hubs. Examples of secure encrypted connections used in some embodiments include VPN (virtual private network) connections, or secure IPsec (Internet Protocol security) connection.

An example of an entity for which such a virtual network can be established includes a business entity (e.g., a corporation), a non-profit entity (e.g., a hospital, a research organization, etc.), and an education entity (e.g., a university, a college, etc.), or any other type of entity. In some embodiments, multiple secure connection links (e.g., multiple secure tunnels) can be established between a forwarding edge node and a hub node. When multiple such links are defined between a forwarding edge node and a hub node, each secure connection link, in some embodiments, is associated with a different physical network link between the edge node and an external network. For instance, to access external networks in some embodiments, a forwarding edge node has one or more commercial broadband Internet links (e.g., a cable mode and a fiber optic link) to access the Internet, a wireless cellular link (e.g., a 5G LTE network), etc.

In some embodiments, the forwarding edge nodes 1250-1255 forward packets sent to and from the sets of IoT devices 1230-1235 in each of the branch sites 1220-1225. For instance, the set of IoT devices 1230 can be a set of thermostats that are configured to periodically report temperature readings to the set of servers 1242 in the third-party datacenter 1240. As the IoT devices in the set 1230 sends packets with the temperature reading reports, the forwarding edge node 1250 forwards the packets to the datacenter hub 1210 where the firewall services 1212 and IPS/IDS services 1216 are applied to the packets before the hub nodes 1260 forward the packets to the servers 1242 of the third-party datacenter 1240.

As shown, each branch site includes an IoT management system 500 that automatically detects newly deployed IoT devices in the network, classifies these IoT devices, and based on this classification configures the edge nodes 1250/1255 and the service nodes 1270 of the branch sites to perform the correct forwarding and middlebox service operations (e.g., firewall operations, load balancing operations, etc.) on packets sent and received by the IoT devices. Through the SD-WAN controllers (not shown), the IoT management system 500 in some embodiments also configures the datacenter hubs and service nodes (e.g., hubs 1260 and service nodes 1212-16) with forwarding and service rules for these hubs and nodes to use when processing packets sent and received by the IoT devices.

The behavioral assessment engine 330 of the IoT management system 500 detects abnormally behavior of the IoT devices, and if necessary, takes remedial actions to rectify such abnormal behavior. For example, when detecting an IoT device is operating anomalously in a particularly risky manner, the behavioral assessment engine 330 in some embodiments configures the packets sent and received by the IoT device to be examined by a firewall 1270 in the device's branch site, configures the edge node to forward the packets sent by the IoT device to the datacenter 1210, and directs the SD-WAN controller to configure the IPS/IDS services 1216 to examine packets sent and received by the IoT device in order to determine whether the IoT device is being used for an unauthorized access to the SD-WAN or one of the LANs connected by the SD-WAN.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
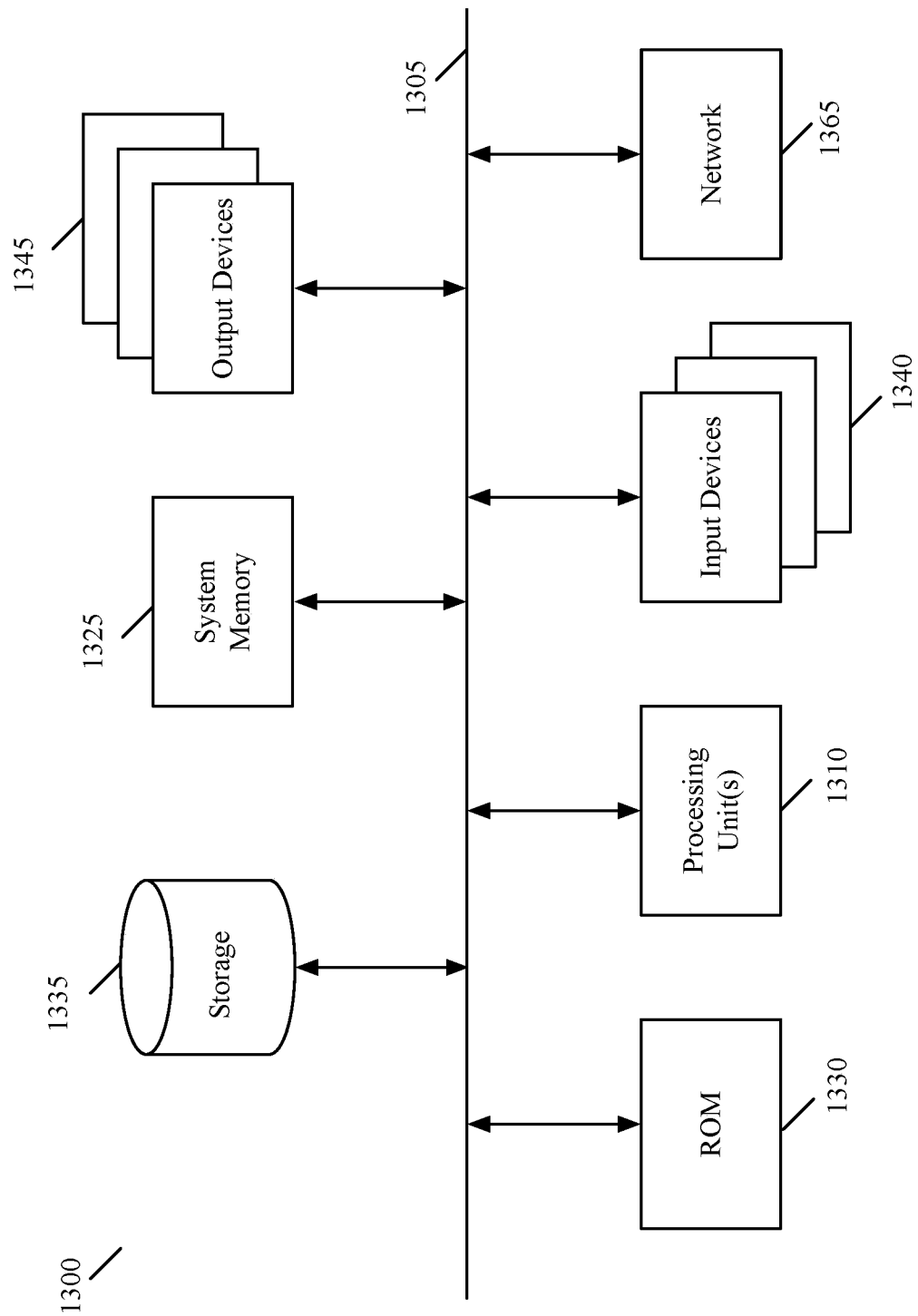
FIG. 13 conceptually illustrates a computer system with which some embodiments of the invention are implemented.

FIG. 13 conceptually illustrates a computer system 1300 with which some embodiments of the invention are implemented. The computer system 1300 can be used to implement any of the above-described servers, controllers, gateway and edge forwarding elements. As such, it can be used to execute any of the above described processes. This computer system includes various types of non-transitory machine readable media and interfaces for various other types of machine readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments. The read-only-memory (ROM) 1330 stores static data and instructions that are needed by the processing unit(s) 1310 and other modules of the computer system. The permanent storage device 1335, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such as random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the computer system. The input devices 1340 include alphanumeric keyboards and pointing devices (also called "cursor control devices"). The output devices 1345 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 13, bus 1305 also couples computer system 1300 to a network 1365 through a network adapter (not shown). In this manner, the computer can be a part of a network of computers (such as a local area network ("LAN"), a wide area network ("WAN"), or an Intranet), or a network of networks (such as the Internet). Any or all components of computer system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third party's private cloud datacenters (e.g., datacenters that the third party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method for defining network policies for IoT (Internet of Things) devices in a network, the method comprising:
   detecting that a particular IoT device has connected to the network;
   after said detecting:
      identifying one or more features of the particular IoT device;
      using a machine-trained network, and feedback received from a behavioral assessment engine indicating anomalous or misclassified behavior of the particular IoT device, to select a subset of identified features to use for classifying the particular IoT device;
      categorizing the particular IoT device based on the selected subset of features,
      wherein categorizing the particular IoT device comprises providing the selected subset of features to a device classification system, wherein the device classification system determines a classification of the particular IoT device based on the selected subset of features, and
      wherein the device classification system determines the classification of the particular IoT device by comparing the selected subset of features of the particular IoT device with sets of features specified by classification rules, each classification rule specifying a category associated with the rule's associated set of features, such that when an IoT device's selected subset of features matches the rule's set of features, the IoT device is assigned the category that is specified by the classification rule; and
      based on categorization, defining a set of network policies to apply to the particular IoT device.

2. The method of claim 1, wherein the defined set of network policies comprise a set of security policies for the particular IoT device.

3. The method of claim 2, wherein the set of security policies comprise firewall policies.

4. The method of claim 2, wherein the set of security policies comprise network access control policies for enforcement by a network access controller that authenticates and authorizes IoT devices newly connected to the network.

5. The method of claim 1, wherein defining the set of network policies to apply to the particular IoT device further comprises programming one or more network policy engines to apply the defined set of network policies to the particular IoT device.

6. The method of claim 1, wherein each classification in the device classification system is defined by a set of one or more features.

7. The method of claim 1, wherein identifying one or more features comprises collecting data tuples regarding the features over a duration of time.

8. The method of claim 7, wherein collected data tuples comprises any one of server time-series, transmitted bytes time-series, received bytes time-series, network protocol time-series, Wi-Fi metrics time-series, network attributes time-series, device attributes time-series, and network device time-series.

9. The method of claim 1, wherein the machine trained network is trained by using known feature sets of IoT device groups, wherein the selected subset of identified features is associated with a particular IoT device group.

10. The method of claim 9, wherein the subset of features are features determined to be relevant to IoT devices of a same classification as the particular IoT device.

11. A non-transitory machine readable medium storing a program for execution by a set of processing units, the program for defining network policies for IoT (Internet of Things) devices in a network, the program comprising sets of instructions for:
    detecting that a particular IoT device has connected to the network;
    after said detecting:
       identifying one or more features of the particular IoT device;
       using a machine-trained network, and feedback received from a behavioral assessment engine indicating anomalous or misclassified behavior of the particular IoT device, to select a subset of identified features to use for classifying the particular IoT device;
       based on the selected subset of features, associating the particular IoT device with a category of IoT devices,
       wherein associating the particular IoT device comprises determining a classification of the particular IoT device based on the selected subset of features, and
       wherein determining the classification of the particular IoT device comprises comparing the selected subset of features of the particular IoT device with sets of features specified by classification rules, each classification rule specifying a category associated with the rule's associated set of features, such that when an IoT device's selected subset of features matches the rule's set of features, the IoT device is assigned the category that is specified by the classification rule; and
       based on the category association, defining a set of network policies for the particular IoT device and applying the set of network policies to the particular IoT device.

12. The non-transitory machine readable medium of claim 11, wherein the defined set of network policies comprise a set of security policies for the particular IoT device.

13. The non-transitory machine readable medium of claim 12, wherein the set of security policies comprise firewall policies.

14. The non-transitory machine readable medium of claim 11, wherein the set of instructions for defining the set of network policies to apply to the particular IoT device further comprises a set of instructions for programming one or more network policy engines to apply the defined set of network policies to the particular IoT device.

15. The non-transitory machine readable medium of claim 11, wherein the set of instructions for associating the particular IoT device with a category further comprises a set of instructions for providing the selected subset of features to a device classification system, wherein the device classification system determines a classification the particular IoT device based on the selected subset of features.

16. The non-transitory machine readable medium of claim 15, wherein each classification in the device classification system is defined by a set of one or more features.

17. The non-transitory machine readable medium of claim 11, wherein the set of instructions for identifying one or more features further comprises a set of instructions collecting data tuples regarding the features over a duration of time.

18. The non-transitory machine readable medium of claim 17, wherein collected data tuples comprise any one of server time-series, transmitted bytes time-series, received bytes time-series, network protocol time-series, Wi-Fi metrics time-series, network attributes time-series, device attributes time-series, and network device time-series.

19. The non-transitory machine readable medium of claim 11, wherein the machine trained network is trained by using known feature sets of IoT device groups, wherein the selected subset of identified features is associated with a particular IoT device group.

20. The non-transitory machine readable medium of claim 19, wherein the subset of features are features determined to be relevant to IoT devices of a same classification as the particular IoT device.

* * * * *